United States Patent
Miyawaki et al.

[11] Patent Number: 5,979,011
[45] Date of Patent: Nov. 9, 1999

[54] DUST REMOVING APPARATUS

[75] Inventors: Hiroshi Miyawaki; Keiji Morimoto; Takahisa Miyamori; Shinji Azuma, all of Wakayama; Mitsuhiko Itojima, Wakayama-ken, all of Japan

[73] Assignee: Noritsu Koki Co., Ltd, Wakayama-ken, Japan

[21] Appl. No.: 08/825,284

[22] Filed: Mar. 27, 1997

Related U.S. Application Data

[63] Continuation-in-part of application No. 08/418,983, Apr. 7, 1995, Pat. No. 5,655,252.

[30] Foreign Application Priority Data

Apr. 1, 1996 [JP] Japan .................................... 8-078771

[51] Int. Cl.⁶ .............................. G03C 11/06; B08B 11/00
[52] U.S. Cl. ............................... 15/308; 15/22.3; 15/88.3; 15/104.002; 15/256.5
[58] Field of Search .............. 15/22.3, 104.002, 15/256.53, 88.3, 256.5

[56] References Cited

U.S. PATENT DOCUMENTS

| | | |
|---|---|---|
| 582,209 | 5/1897 | Seufert . |
| 1,689,497 | 10/1928 | Morgal . |
| 2,171,631 | 9/1939 | Moncrieff et al. . |
| 2,524,928 | 10/1950 | Platz . |
| 3,139,975 | 7/1964 | Schaefer . |
| 3,398,022 | 8/1968 | Maust . |
| 4,706,325 | 11/1987 | Michelson . |
| 5,286,303 | 2/1994 | Avelis . |
| 5,349,714 | 9/1994 | Korbonski et al. ............ 15/104.002 X |
| 5,423,104 | 6/1995 | West ............................... 15/104.002 X |
| 5,425,813 | 6/1995 | Ernst et al. .................... 15/104.002 X |

Primary Examiner—Chris K. Moore
Attorney, Agent, or Firm—Fulbright & Jaworski, LLP

[57] ABSTRACT

An apparatus for removing dust from a photographic film is disclosed. The apparatus includes cylindrical rotatable dust removing members disposed upwardly and downwardly of the film, and a dust take-off member disposed adjacent the dust removing members for taking off the dust from the dust removing members. The dust removing members may be brush members or members having an adhesive face. Further, these dust removing members may be adapted to be movable between a dust removing position and a non dust removing position.

13 Claims, 18 Drawing Sheets

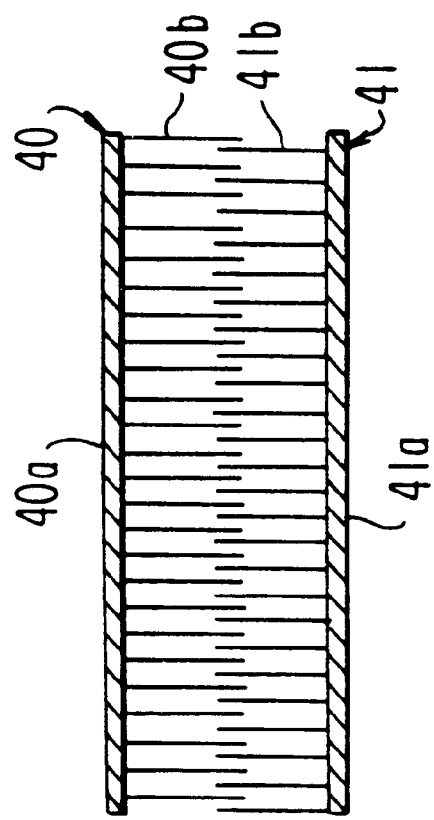
FIG.3

DUST REMOVING APPARATUS

This application is a continuation-in-part of U.S. application Ser. No. 08/418,983 filed Apr. 7, 1995, now U.S. Pat. No. 5,655,252, issued Aug. 12, 1997.

BACKGROUND OF THE INVENTION

1. Field of the Invention

The present invention relates to an apparatus for removing dust from a dusty surface of e.g. a photosensitive material.

2. Description of the Related Art

A dust removing apparatus of the above-noted type functions to remove dust adhered to a surface of a photosensitive material such as a photographic film which is transported along a transport passage.

A conventional apparatus provides e.g. a dust removing member such as a brush fixedly disposed at a location in the transport passage of the material, so that the dust removing operation is effected as the brush picks up the dust from the material which is transported through the location of the brush.

With the above-described conventional art, however, the dust removing member such as the brush is fixedly disposed and the dust is removed from the material surface in association with the transportation of the material. Hence, the dust removing ability of the apparatus is significantly limited. Further, if the brush has some irregularity in the density of its bristles or the dust is adhered to a certain portion of the material in a concentrated manner, this leads to local concentration, i.e. unevenness, in the dust removing operation, and the dust cannot be removed properly.

The present invention is addressed to the above-described problem and a first object of the invention is to provide a dust removing apparatus for a photosensitive material, which may reliably remove dust adhered to a surface of the material.

A second object of the present invention is to facilitate proper maintenance of the transported material within the transport passage, while achieving the first object.

SUMMARY OF THE INVENTION

For fulfilling the above-noted object, according to one aspect of the present invention, a dust removing apparatus for removing dust from a sheet-like photosensitive material transported along a transport passage, comprises:

a stationary portion;

dust removing means movable relative to the stationary portion and having a dust removing face for coming into contact with the sheet-like material; and dust take-off means having an adhesive face which comes into contact with the dust removing face to take the dust off the dust removing face by adhesion thereto.

Namely, with the simple construction including the dust take-off means or member having an adhesive face, the dust may be taken off the dust removing face.

Consequently, the invention has provided a dust removing apparatus having a simple overall construction, yet capable of reliably removing dust from a dusty surface.

According to a further aspect of the invention, the dust removing means includes a first dust removing member having a first dust-removing portion for removing dust from a front surface of the sheet-like material and a second dust removing member having a second dust removing portion for removing dust from a back surface of the sheet-like material.

Preferably, each of the first and second dust removing member is formed a substantially cylindrical member with brush attached to a peripheral face thereof, and drive means is provided for rotatably driving the first dust removing member about an axis extending at the center of a substantially circular cross section of the first dust removing member when the first dust removing portion is maintained in contact with the dusty face of the sheet-like material.

With the above construction, the apparatus, with the simple and compact construction including the dust removing member having a brushy dust removing peripheral face, is capable of reliably removing dust from a dusty face of the sheet-like material.

As a result, the construction of the entire apparatrus may be further simplified.

According to a still further aspect of the invention, the dust take-off means is formed as a substantially cylindrical member having an adhesive peripheral face.

According to a still further aspect, at least one of the first and second dust removing portions has a conductive portion.

With the above, dust electrostatically attached to the material face may be removed therefrom in an efficient manner.

As a result, the dust removing performance of the apparatus may be further improved.

Preferably, at lease one of the first and second dust removing portions has adhesive property at a predetermined portion thereof.

With the above, at the predetermined portion of at least one of the first and second dust removing portions, the dust attached to the material face may be removed by means of the adhesive force.

That is to say, the dust removing portion or face includes both a brush portion and an adhesive portion.

In general, the adhesive portion has a greater dust collecting force than the brush portion. Hence, although the presence of the adhesive portion provides greater resistance against the relative movement between the dust removing face of the dust removing means and the material surface, the above arrangement can remove the dust from the material surface more reliably.

Therefore, the adhesive portion will be provided in a limited manner, in the dust removing face, only at such a portion thereof where more reliable dust removal is desired in particular. With this, while minimizing the resistance against the relative movement between the dust removing face and the material surface, more effective dust removal operation is possible in a concentrated manner for a certain desired portion of the material surface.

Consequently, the dust removal operation may be effected in accordance with the particular local condition of the dusty material surface, so that the apparatus with this feature will be more convenient.

According to a still further aspect of the invention, the dust removing means includes a first dust removing member which has a substantially cylindrical configuration and is rotatable about the axis extending through the center of substantially circular cross section of the first dust removing member, and the first dust removing portion has adhesive force weaker than the adhesive force of the adhesive face of the dust take-off means and removes the dust from the material surface by coming into contact therewith.

With the above construction, the first dust removing member has substantially cylindrical configuration and its adhesive peripheral face as the first dust removing portion comes into contact with the dusty material surface for removing dust therefrom.

Further, since the adhesive force of the first dust removing portion is weaker than the adhesive force of the adhesive face of the dust take-off means, the dust adhered to the first dust removing portion may be removed therefrom through the contact between the adhesive face of the dust take-off means and the first dust removing portion.

That is to say, the dust may be reliably removed from the material surface by the first dust removing portion having adhesive property; and then this dust adhered to the first dust removing portion may be removed therefrom by the dust take-off means.

As a result, the dust removing performance of the apparatus may be further improved.

According to a still further aspect of the invention, the dust take-off means is a substantially cylindrical take-off member having an adhesive peripheral face.

With the above construction in combination with the substantially cylindrical dust removing member, the entire apparatus may be formed further compact, yet the dust may be more effectively eliminated from the dust removing member.

According to a still further aspect of the invention, the dusty material surface comprises a planar portion of an elongate band-like material transported along the transport passage, and the second dust removing member is disposed adjacent the first dust removing member, the first dust removing portion of the first dust removing member extends discontinuously in the direction of the rotary axis of the first dust removing member, the second dust removing portion of the second dust removing member extends discontinuously in the direction of the rotary axis, and the first dust removing portion of the first dust removing member and the second dust removing portion of the second dust removing member are disposed alternately to each other in the direction of the rotary axis.

With the above construction, the dust removing face of each dust removing member extends discontinuously relative to the direction of the rotary axis. Hence, compared with a construction in which the dust removing face extends continuously in this direction, each dust removing member applies a smaller adhesive force to the dusty planar face of the elongate band-like material.

Namely, if the dust removing member provided an excessive adhesive force to the elongate band-like material, this dust removing member might entangle the elongate band-like material thus hindering proper transportation thereof. On the other hand, with the reduction of the adhesive force applied from the dust removing member to the elongate band-like material, such accident may be effectively avoided.

As a result, this construction achieves reliable dust removal operation from the dusty surface, while allowing proper transportation of the elongate band-like material.

According to a still further aspect of the invention, the dust removing portion is adapted to be movable between a first position where the dust removing portion provides no dust removing effect to the material surface and a second position where the dust removing portion provides the dust removing effect to the material surface.

The above construction allows smooth and easy insertion of the material between the dust removing portions.

As a result, even when the leading end of the material, e.g. a photographic film, is curved or bent, this will not result in jamming of the material during its insertion into the apparatus, so that the dust removing performance of the dust removing apparatus will be further improved.

Further and other objects, features and effects of the invention will become more apparent from the following more detailed description of the embodiments of the invention with reference to the accompanying drawings.

BRIEF DESCRIPTION OF THE DRAWINGS

FIG. 3 is an enlarged view of the major portions relating to the first embodiment.

DETAILED DESCRIPTION OF THE PREFERRED EMBODIMENTS

A first preferred embodiment of the invention relating to a dust removing apparatus incorporated in an image printer system, will be described next.

Figure 1:
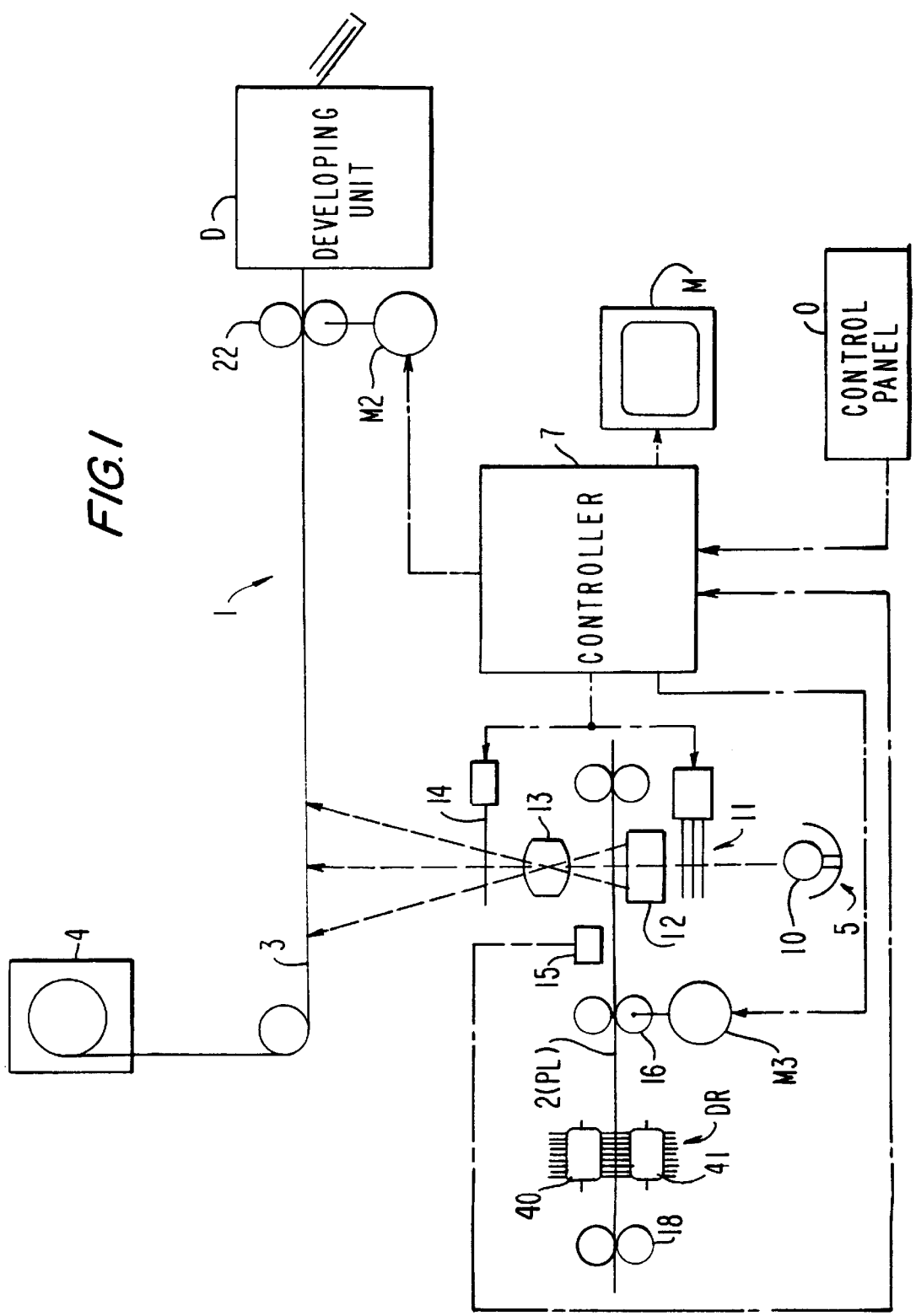
FIG. 1 is a schematic construction view relating to a first embodiment of the present invention.

As shown in FIG. 1, an image printer system 1 includes a projection exposure section 5 for projecting and exposing onto a print paper 3 an image of a sheet-like photographic photosensitive material PL such as a photographic film 2, and a developing section D for developing the exposed print paper 3.

The print paper 3 withdrawn from a print-paper magazine 4 in which the paper 3 is stored in a convoluted state, is exposed at the projection exposure section 5 and then developed at the developing section D. Thereafter, the print paper is cut into segments each containing one-frame amount of image information and discharged from the system.

Next, the respective components listed above will be described.

The projection exposure section 5 includes a projection exposure light source 10, a light modulating filter 11 for adjusting color balance of the light beam to be irradiated onto the photographic film 2, a mirror tunnel 12 for uniformly mixing the light passing through the light modulating filter 11, a printing lens 13 for imaging the image information of the photographic film 2 on the print paper 3 and a shutter 14, with all the above elements being disposed on a common optical axis.

On the upstream side at the projection exposure section 5 in a transport passage of the photographic film 2, there is provided an image sensor 15 for reading the image information of the photographic film 2 in the form of a plurality of discrete areas. Referring more particularly to the function of the image sensor 15, a white light beam is irradiated on the photographic film 2 and the intensity of its reflected or transmission light is measured by means of e.g. a CCD line sensor or a CCD image sensor with the light being separated into the three primary color components of red, green and blue. The image information read by the image sensor 15 is then transmitted to a controller 7 to be used for obtaining exposure conditions at the projection exposure section 5 and also the controller produces and presents a simulated image on a monitor M, which simulated image would result from the read image information if exposed on the print paper 3 under the obtained exposure conditions.

On the upstream side of the image sensor 15 in the transport passage of the photographic film 2, there are provided rollers 16, 18 for feeding the photographic film 2 to the projection exposure section 5 and a motor M3 for rotatably driving the rollers 16, 18.

Between the rollers 16, 18 in the transport passage of the photographic film 2, there is provided a dust removing apparatus DR for the photographic film 2. Front and back surfaces of the photographic film 2 comprise dusty material surfaces 2a to be treated by the dust removing apparatus.

Figure 2:
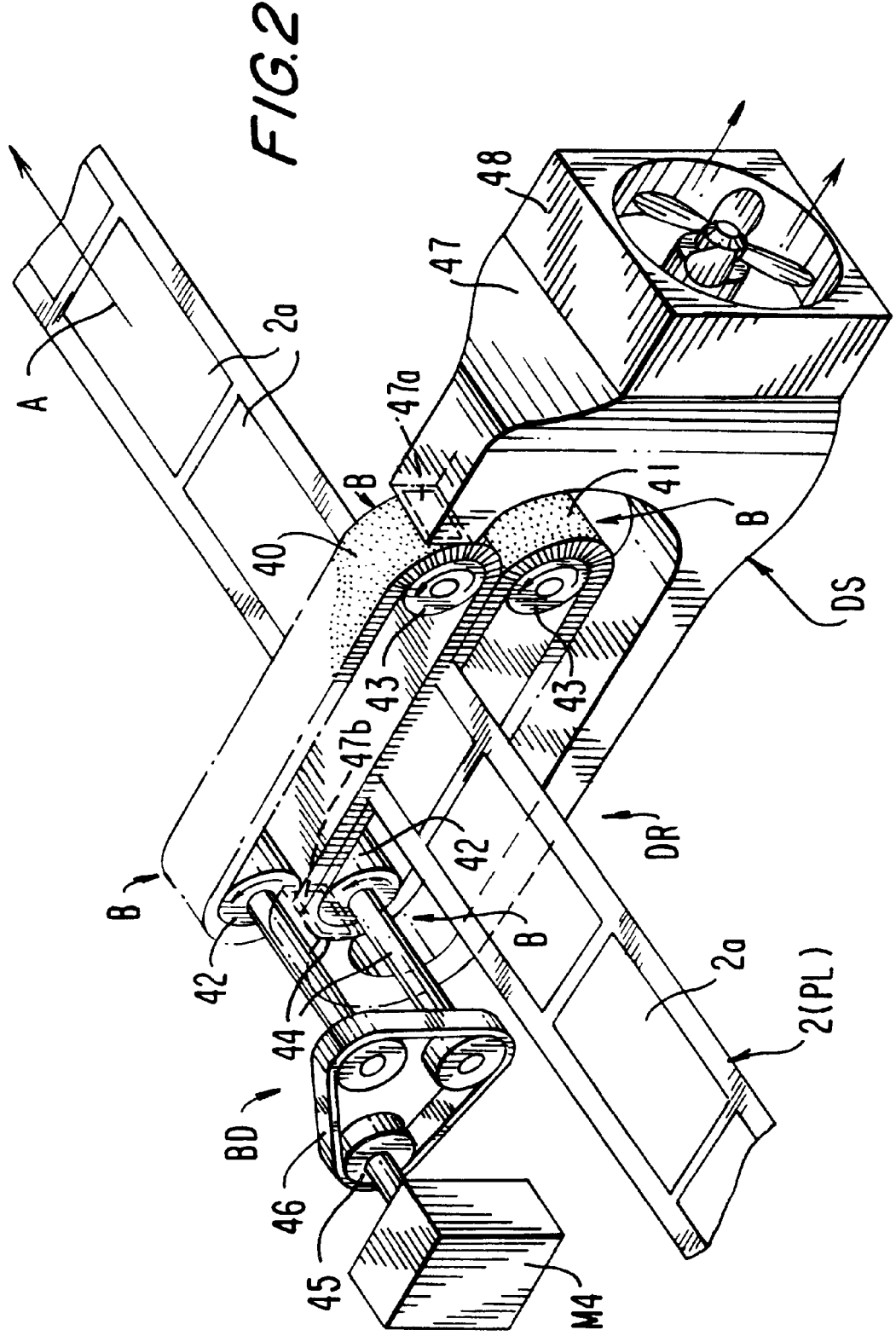
FIG. 2 is a perspective view of major portions relating to the first embodiment of the present invention.

The dust removing apparatus DR, as shown in FIG. 2, includes upper and lower brush belts 40, 41 as first and second dust removing members respectively of dust removing means in the form of endless belts disposed upwardly and downwardly of the transport passage of the photographic film 2, a suction means DS, as dust take-off means, for sucking dust adhered to the upper and lower brush belts 40, 41 and a drive means BD for rotatably driving the upper and lower brush belts 40, 41. The suction means DS functions as a dust-take-off member DE.

The drive means BD includes drive rollers 42 and driven rollers 43 around which the brush belts 40, 41 are entrained, connector shafts 44 connected with the drive rollers 42, a motor M4 for rotatably driving the brush belts 40, 41, and a transmission belt 46 entrained around a motor roller 45 mounted at a leading end of a rotary shaft of the motor M4 and also leading ends of the two connector shafts 44 for transmitting the drive force of the motor M4. Then, in operation, the brush belts 40, 41 are driven to rotate counterclockwise as viewed from the transport direction of the photographic film 2.

The suction means DS includes an air duct 47 having openings 47a, 47b respectively at a position adjacent the driven roller 43 about which the upper brush roller 40 is entrained and a further position adjacent the drive roller 42 about which the lower brush belt 41 is entrained, and also a fan 48 communicated with the air duct 47. The fan 48 is rotated in a direction for withdrawing the dust from the brush belts 40, 41 through the openings 47a, 47b.

As shown in FIG. 3, the brush belts 40, 41 include bristles 40a, 41b on the side thereof contacting the photographic film 2. Where the upper brush belt 40 and the lower brush belt 41 face each other, the leading ends of the upper and lower bristles 40b, 41b extend with an overlap therebetween.

The photographic film 2 is forcibly transported through the overlapping bristles 40b, 41b, so that the upper and lower brush belts 40, 41 come into contact with the front and back surfaces of the photographic film 2 respectively.

Further, the brush belts 40, 41 are entrained about the drive and driven rollers 42, 43 so that the belts are driven to run at 90 degrees transversely relative to the transport direction of the photographic film 2 denoted by an arrow A in FIG. 2.

Since both the upper brush belt 40 and the lower brush belt 41 are rotated counterclockwise as viewed from the transport direction of the photographic film 2, a pair of contact portions of the belts 40, 41 contacting the photographic film 2 are driven in opposite directions to each other at one location on the transport direction of the photographic film 2.

The drive rollers 42 and the driven rollers 43 are disposed away from each other on the left and right sides of the photographic film 2, so that curved portions B of the belts 40, 41 formed by the presence of the drive and driven rollers 42, 43 too are disposed away from the photographic film 2.

The openings 47a, 47b of the air duct 47 of the suction means DS are disposed to face the first one of the curved portions B to which the belts first come into opposition after the contact with the photographic film 2. More specifically, as both the upper brush belt 40 and the lower brush belt 41 are driven to rotate counterclockwise as viewed relative to the transport direction of the photographic film 2, the opening 47a for the upper brush belt 40 is disposed to face the curved portion B adjacent the fan 48 and the opening 47b for the lower brush belt 41 is disposed to face the other curved portion B distant from the fan 48, so as to suck dust adhered to the belts 40, 41 located at the respective curved portions B. In this manner, since the dust adhered to the brush belts 40, 41 is eliminated at the first curved portion B after contact with the photographic film 2, the dust may be eliminated from the brush belts 40, 41 without being scattered about.

At the projection exposure section 5, based on the image information of the photographic film 2 read by the image sensor 15 in association with feeding of the photographic film 2 by the rollers 16, 18 and the motor M3, the controller 7 controls the light modulating filter 11 to adjust the irradiation light beam of the projection exposure light source 10 to a color balance according to the color densities of the image of the photographic film 2, and then this adjusted light beam is irradiated on the photographic film 2 to print the image information of the photographic film 2 on the print paper 3.

On the downstream side of the projection exposure section 5 in the transport passage of the print paper, there are disposed rollers 22 for transporting the print paper 3 and a motor M2 for driving the rollers 22.

Though not shown, the developing section D includes a plurality of tanks filled with processing liquids for the development of the exposed print paper 3, such that the print paper 3 is developed by its successive passage through the plurality of tanks.

Next, an exposure operation on the print paper 3 by the image printer 1 will be briefly described.

After start-up of the image printer 1, the photographic film 2 is charged to the projection exposure section 5; then, the motor M3 is activated to start transporting the photographic film 2.

Upon detection of approaching movement of the photographic film 2 by means of an unillustrated sensor, the motor M4 of the dust removing apparatus DR is activated to start rotatably driving the brush belts 40, 41.

As the photographic film 2 is caused to pass the disposing positions of the brush belts 40, 41, dust is removed from the photographic film 2 by the brush belts 40, 41 and this dust picked up by the brush belts 40, 41 is taken off by being sucked by the suction means DS.

After its passage through the dust removing apparatus DR, image information of a frame 2a of the photographic film 2 is read by the image sensor 15 and this frame 2a is transported to an exposing position.

The controller 7 obtains exposure conditions based on the image information read by the image sensor 15 and then produces and presents on the monitor M a simulation image of the information which would result as a photographic printed image on the print paper 3 if the film image were exposed under the obtained exposure conditions.

By observing the displayed image on the monitor M, an operator inputs a correction instruction from a control panel O if such correction is necessary. Otherwise, the operation inputs the exposure conditions without any correction from the control panel O.

With this input of instruction for exposure, at the projection exposure section 5, the image of the photographic film 2 is exposed on the print paper 3 under the determined exposure conditions.

Second Embodiment

A second embodiment will be described next with reference to FIG. 4.

In the above first embodiment, the pair of contact portions of the brush belts 40, 41 of the dust removing apparatus DR contacting respectively the front and back faces of the photographic film 2 are driven to rotate in the opposite directions to each other at the single location relative to the transport direction of the photographic film 2. Instead, these contact portions may be driven in a same direction.

Figure 4:
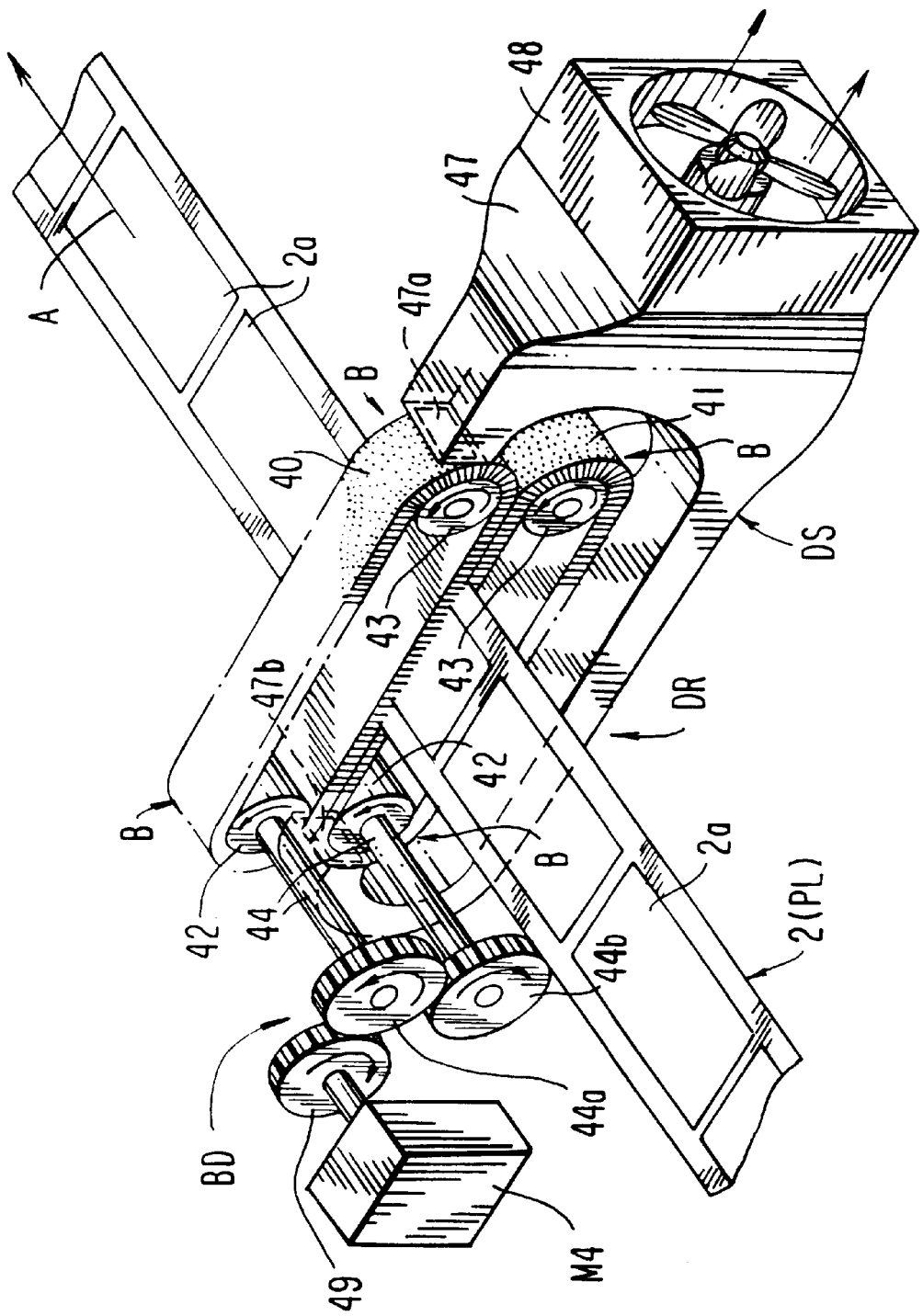
FIG. 4 is a perspective view of major portions relating to a second embodiment of the invention.

That is, as shown in FIG. 4, the two connecting shafts 44 mount gears 44a, 44b of same number of teeth meshing with each other. And, the one gear 44a meshes also the drive gear 49 mounted on the rotary shaft of the motor M4.

With this construction, as the motor M4 rotates, the upper brush belt 40 is driven to rotate counterclockwise relative to the transport direction of the photographic film 2, while the lower brush belt 41 is driven to rotate clockwise relative to the same.

Incidentally, in both the first embodiment and this second embodiment, the transmission mechanism for transmitting the drive of the motor M4 may be modified in a variety of manners.

Third Embodiment

A third embodiment of a dust removing apparatus as incorporated in an image printer will be described with corresponding drawings.

Figure 5:
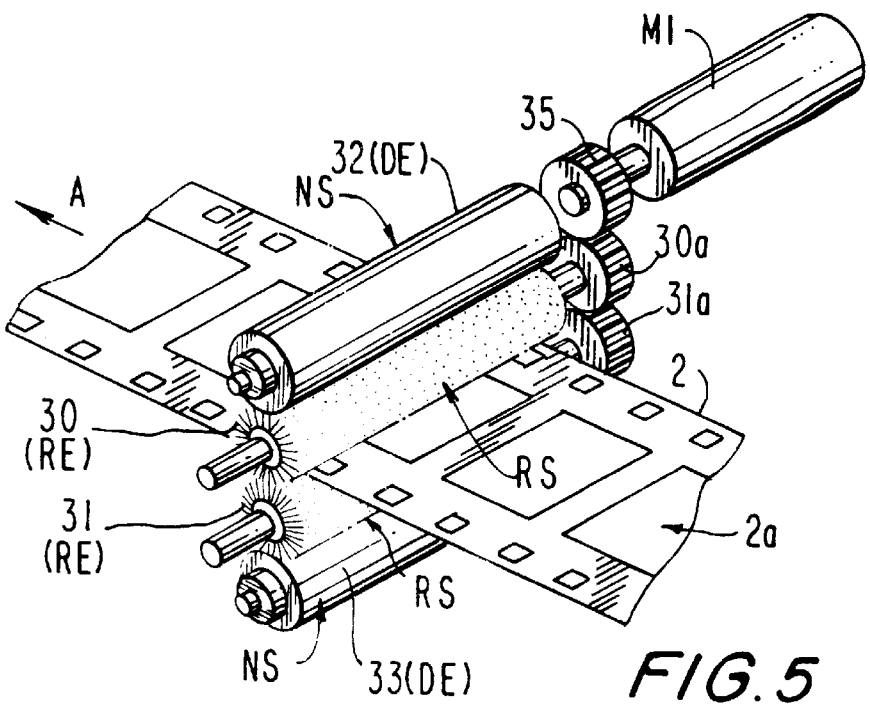
FIG. 5 is a perspective view of major portions relating to a third embodiment of the invention.
Figure 6:
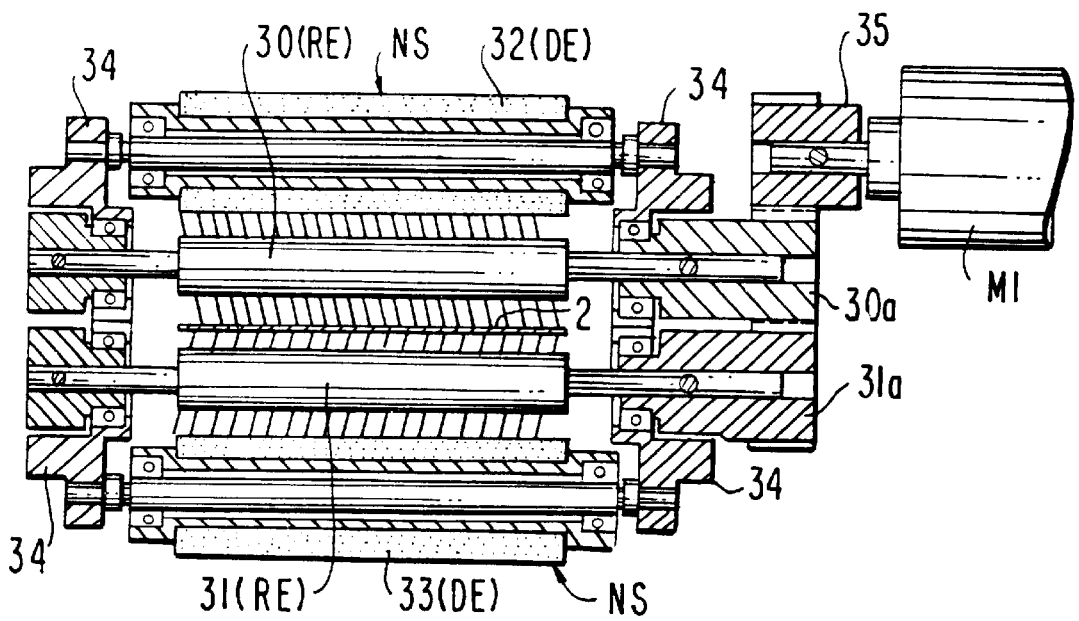
FIG. 6 is a section view of the major portions relating to the third embodiment.
Figure 7:
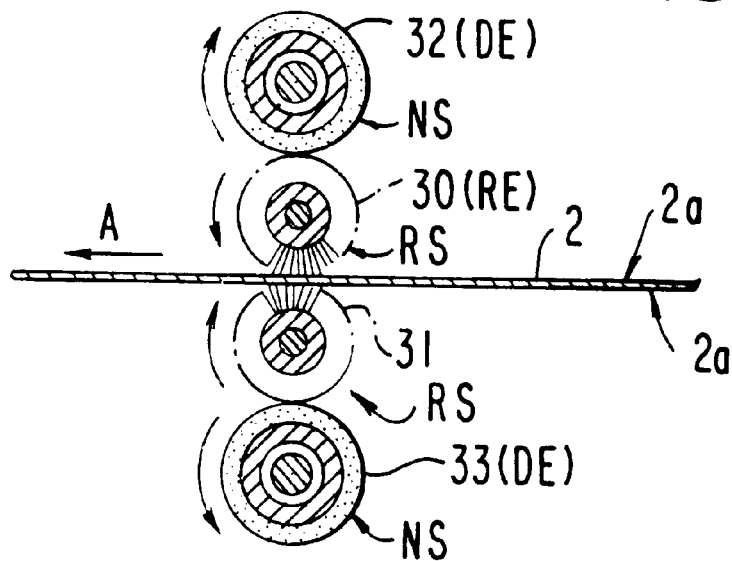
FIG. 7 is a side view of the major portions relating to the third embodiment.

As shown in FIGS. 5 through 7, a dust removing apparatus DR of this embodiment includes brush rollers 30, 31 disposed upwardly and downwardly across the transport passage of the photographic film 2 as first and second dust removing members RE of dust removing means for removing dust from the photographic film 2 through contact therewith, adhesive rollers 32, 33 disposed upwardly and downwardly of the brush rollers 30, 31 as dust take-off means DE for taking off the dust adhered to the brush rollers 30, 31, and a motor M1 as drive means for rotatably driving the brush rollers 30, 31.

The upper brush roller 30 and the lower brush roller 31 are of a same substantially cylindrical configuration, and a peripheral face of each cylindrical roller includes brush bristles made of e.g. PVC to obtain electric conductivity, so that the peripheral faces of these rollers respectively constitute first and second dust removing portions RS.

Further, the upper adhesive roller 32 and the lower adhesive roller 33 are of a same substantially cylindrical configuration and formed mainly of urethane resin material, and the peripheral face of each cylindrical roller, i.e. the face formed of the urethane resin material, is applied with an adhesive material, so that these faces constitute adhesive faces NS.

As shown in a section view of FIG. 6, the brush rollers 30, 31 and the adhesive rollers 32, 33 are rotatably supported via bearings to a stationary support frame 44, and leading ends of the bristles of the upper and lower brush rollers 30, 31 are placed in contact with the adhesive faces NS of the adhesive rollers 32, 33, respectively.

As shown in FIGS. 5 and 6, the drive of the motor M1 is transmitted to the respective brush rollers 30, 31 through meshing between the drive gear 35 mounted on the rotary shaft of the motor M1 and a driven gear 30a mounted on a rotary shaft of the upper brush roller 30 and meshing between this driven gear 30a and a driven gear 31a mounted on a rotary shaft of the lower brush roller 31.

As shown in FIG. 7, relative to the transport direction of the photographic film 2 denoted with an arrow A, the upper brush roller 30 is driven to rotate counterclockwise while the lower brush roller 31 is driven to rotate clockwise.

The adhesive rollers 32, 33 are not directly driven by the motor M1, but through their contact with the brush rollers 30, 31, the upper adhesive roller 32 is rotated clockwise and the lower adhesive roller 33 is rotated counterclockwise in FIG. 7.

As the brush rollers 30, 31 and the adhesive rollers 32, 33 are rotated in the above-described manners, i.e. various portions of the dust removing faces RS are continuously and alternately brought to the dust removing positions, namely, the positions contacting the photographic film 2, dust adhered to the film faces 2a of the photographic film 2 transported in the direction of arrow A is picked up without being scattered over to the upstream side of the transport direction of the photographic film 2, and this dust adhered to the dust removing faces RS of the brush rollers 30, 31 is eliminated therefrom by the adhesive force of the adhesive faces NS of the adhesive rollers 32, 33 at non-removing positions on the opposite side to the contact positions with the photographic film 2.

The dust adhered to the adhesive faces NS of the adhesive rollers 32, 33 may be cleaned periodically.

Next, an exposure operation on the print paper 3 by the image printer 1 will be briefly described.

After start-up of the image printer 1, the photographic film 2 is charged to the projection exposure section 5; then, the motor M3 is activated to start transporting the photographic film 2.

Upon detection of approaching movement of the photographic film 2 by means of an unillustrated sensor, the motor M1 of the dust removing apparatus DR is activated to start rotatably driving the brush rollers 30, 31.

As the photographic film 2 is caused to pass the disposing positions of the brush rollers 30, 31, dust is removed from the photographic film 2 by the brush rollers 30, 31 and this dust picked up by the brush rollers 30, 31 is eliminated therefrom by the adhesive rollers 32, 33.

After its passage through the dust removing apparatus DR, image information of a frame 2a of the photographic film 2 is read by the image sensor and this frame 2a is transported to an exposing position.

The controller 7 obtains exposure conditions based on the image information read by the image sensor 15 and then produces and presents on the monitor M a simulation image of the information which would result as a photographic printed image on the print paper 3 if the image were exposed under the obtained exposure conditions.

By observing the displayed image on the monitor M, an operator inputs a correction instruction from the control panel O if such correction is necessary. Otherwise, the operation directly inputs the exposure conditions without any corrections from the control panel O.

With this input of instruction for exposure, at the projection exposure section 5, the image of the photographic film 2 is exposed on the print paper 3 under the determined exposure conditions.

Fourth Embodiment

Next, a fourth embodiment of the invention will be described with reference to FIG. 8.

In the above third embodiment, the dust sticking to the photographic film 2 is eliminated only by the brushy peripheral faces of the brush rollers 30, 31. Instead, as shown in FIG. 8, the brush rollers 30, 31 as the dust removing members RE, may include, at right and left ends thereof as predetermined positions, auxiliary adhesive faces 30b, 31b having adhesive property so as to eliminate the dust from the photographic film 2 with a stronger force than that provided by the brush faces.

More particularly, the auxiliary adhesive faces 30b, 31b will be provided in a limited manner only at such portions corresponding to particular portions of the photographic film where more thorough dust cleaning is desired. In this respect, through appropriate adjustment of mixing ratio of the materials forming the adhesive material used, the adhesive force of the auxiliary adhesive faces 30b, 31b is rendered positively weaker than the adhesive force of the adhesive faces NS of the adhesive rollers 32, 33, such that the dust adhered to the auxiliary adhesive faces 30b, 31b may be reliably eliminated by the adhesive rollers 32, 33.

Figure 8:
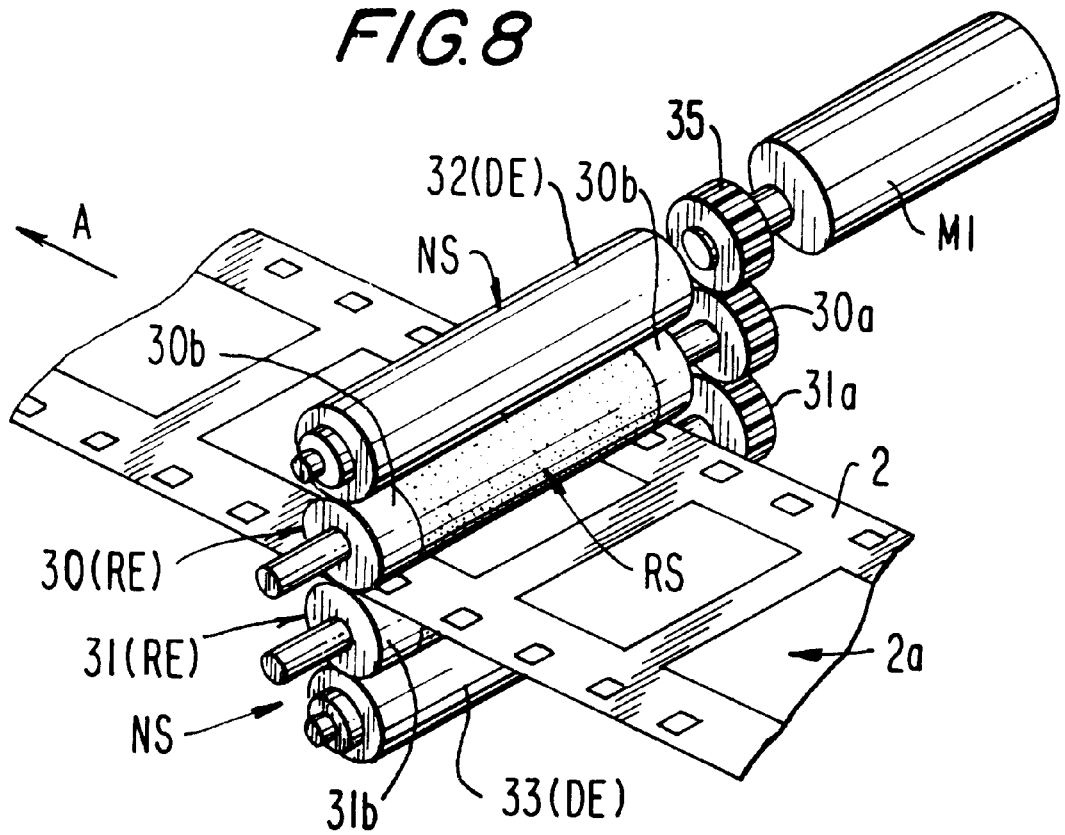
FIG. 8 is a perspective view of major portions relating to a fourth embodiment of the invention.

In the sample condition shown in FIG. 8, the positions of the auxiliary adhesive faces 30b, 31b are caused to correspond to the position of perforations of the photographic film, so that these areas of perforations may be cleaned more thoroughly than the other portion of the photographic film so as to assure higher reliability for a reading operation of the perforations per se by an optical sensor and a reading operation of a DX code recorded in the vicinity of the perforations by means of optical sensors.

Incidentally, in the case of the construction shown in FIG. 8, the auxiliary adhesive faces 30b, 31b are rotatable together with the brush rollers 30, 31. Instead, the roller portions forming the auxiliary adhesive faces 30b, 31b and those portions of the adhesive rollers 32, 33 contacting the auxiliary adhesive faces 30b, 31b may be rendered freely rotatable, so as to smooth the dust removal and transportation of the photographic film 2.

Fifth Embodiment

Next, a fifth embodiment of the invention will be described with reference to corresponding drawings.

Figure 9:
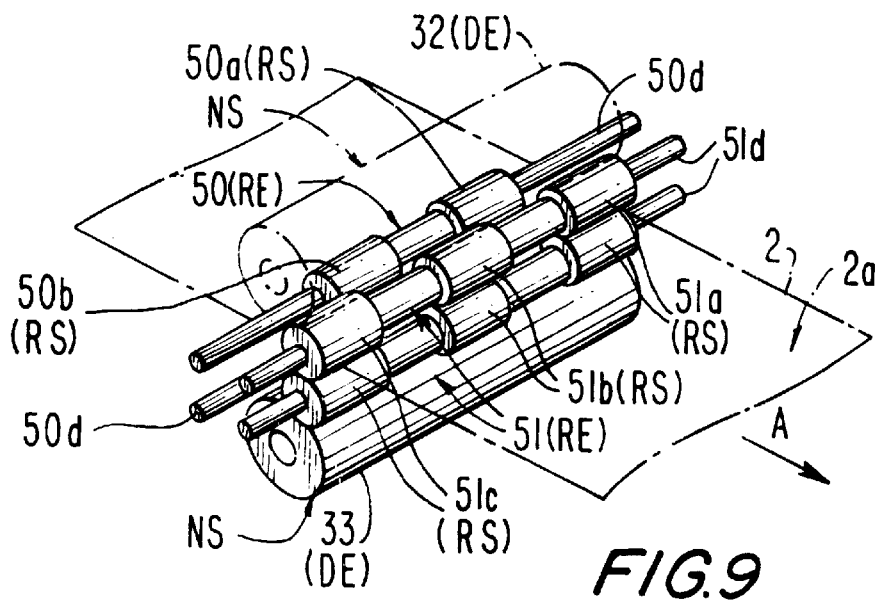
FIG. 9 is a perspective view of major portions relating to a fifth embodiment of the invention.
Figure 10:
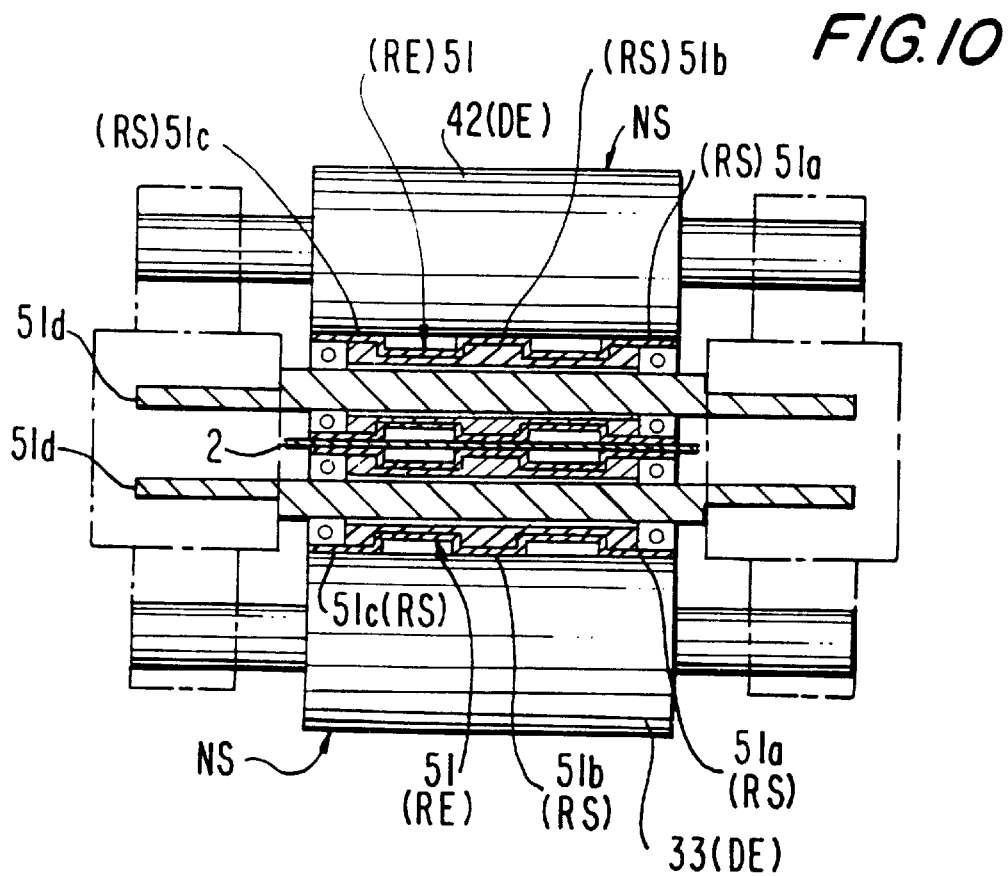
FIG. 10 is a section view of the major portions relating to the fifth embodiment.
Figure 11:
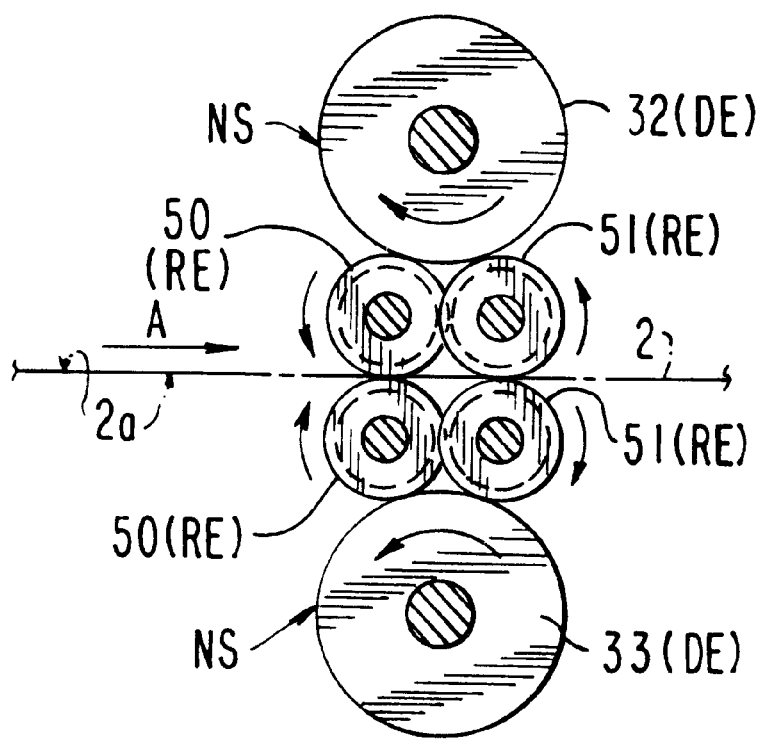
FIG. 11 is a side view of the major portions relating to the fifth embodiment.
Figure 12:
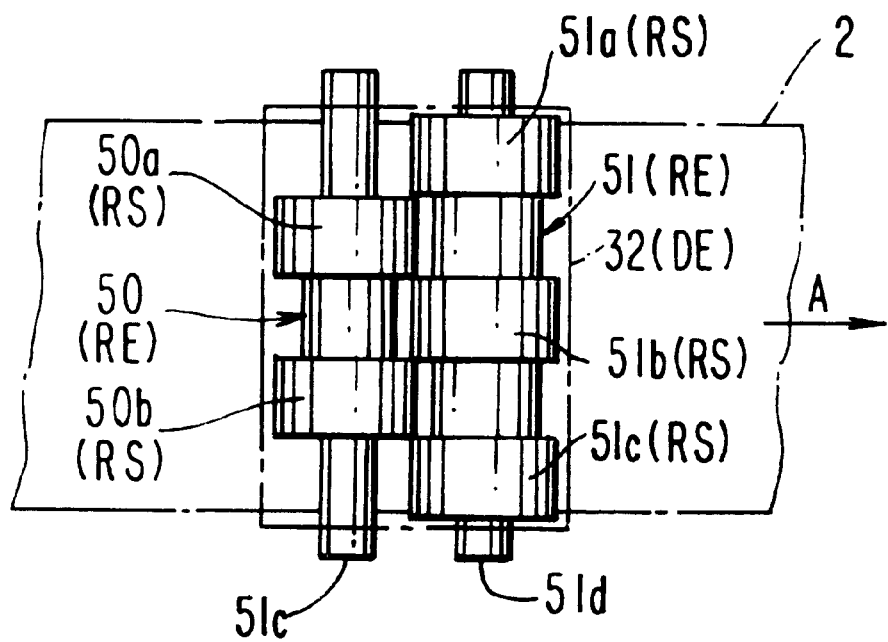
FIG. 12 is a plan view of the major portions relating to the fifth embodiment of the invention.

In the foregoing third embodiment, the dust adhered to the photographic film 2 is picked up by the brushy dust removing faces RS of the brush rollers 30, 31. Alternatively, as shown in FIGS. 9 through 11, as dust removing means RE for removing the dust from the front and back film surfaces 2a of the photographic film 2, two segmented type adhesive rollers 50, 51, as first and second dust removing members, may be provided as dust removing means RE to contact the photographic film from the above and under the photographic film 2 one after the other in the transportation direction of the photographic film 2.

Of the two segmented type adhesive rollers 50, 51, the adhesive roller 50 disposed on the upstream side relative to the transportation direction of the photographic film 2 includes, at two separate portions thereof, adhesive faces 50a, 50b as the dust removing faces. The other adhesive roller 51 disposed on the downstream side relative to the transportation direction of the photographic film 2 includes, at three separate portions thereof, adhesive faces 51a, 51b as the first and second dust removing portions RS and still another adhesive face 51c. The adhesive faces 50a, 50b of the roller 50 and the adhesive faces 51a, 51b, 51c of the roller 51 are disposed alternately relative to the width of the photographic film 2 with leading ends thereof being slightly overlapped with each other.

Through the above-described arrangement of the adhesive faces 50a, 50b, and the adhesive faces 51a, 51b, 51c, as viewed from the longitudinal direction of the photographic film 2, at any location throughout the entire width of the photographic film 2, at least one of the adhesive faces 50a, 50b or the adhesive faces 51a, 51b, 51c is present, so that the entire faces of the photographic film 2 may be subjected to the dust removal operation.

Like the foregoing embodiment, the adhesive faces 50a, 50b and the adhesive faces 51a, 51b, 51c are placed in contact with the adhesive rollers 32, 33 at the non-removing positions substantially on the opposite side to the contacting positions with the photographic film 2. Furthermore, through the appropriate adjustment of mixing ratio of adhesive materials used, the adhesive force of these adhesive faces 50a, 50b, 51a, 51b, 51c is rendered weaker than the adhesive force of the adhesive faces NS of the adhesive rollers 32, 33, such that the dust adhered to the faces 50a, 50b, 51a, 51b, 51c from the photographic film 2 may be reliably removed therefrom by the adhesive rollers 32, 33.

The segmented type adhesive rollers 50, 51 having the above-described constructions are disposed side-symmetrically across the transporting position of the photographic film 2 and remove the dust from the front and back surfaces 2a of the photographic film 2.

Incidentally, the segmented type adhesive rollers 50, 51 are rotatably driven through their contact with the transported photographic film 2 and various portions of the dust removing faces RS are continuously and alternately brought to the positions contacting the photographic film 2. Hence, no motor is absolutely specially needed for driving these segmented type adhesive rollers 50, 51. Yet, in order to reduce load on the motor M3 which transports the photographic film 2, an additional motor may be provided for this special purpose as well.

As to the placement of the segmented type adhesive rollers 50, 51, instead of the above-described placement in which the leading ends of the adhesive faces 50a, 50b are slightly overlapped with the leading ends of the adhesive faces 51a, 51b, 51c, the rollers 50, 51 may be disposed away from each other relative to the longitudinal direction of the photographic film 2, and the lateral widths of the faces 50a, 50b and faces 51a, 51b, 51c may be extended respectively, so that the width-wise ends of the adhesive faces 50a, 50b, and those of the adhesive faces 51a, 51b, 51c are overlapped with each other relative to the longitudinal direction of the photographic film 2. Further, more than three segmented type adhesive rollers 50, 51 may be employed. And, the number of adhesive faces RS may be conveniently varied.

Further, instead of the segmented type adhesive rollers 50, 51, the substantially cylindrical adhesive rollers like the adhesive rollers 32, 33 may be employed as well.

(Sixth Embodiment)

Next, a sixth embodiment of the invention will be described with reference to FIGS. 13 through 16.

Figure 13:
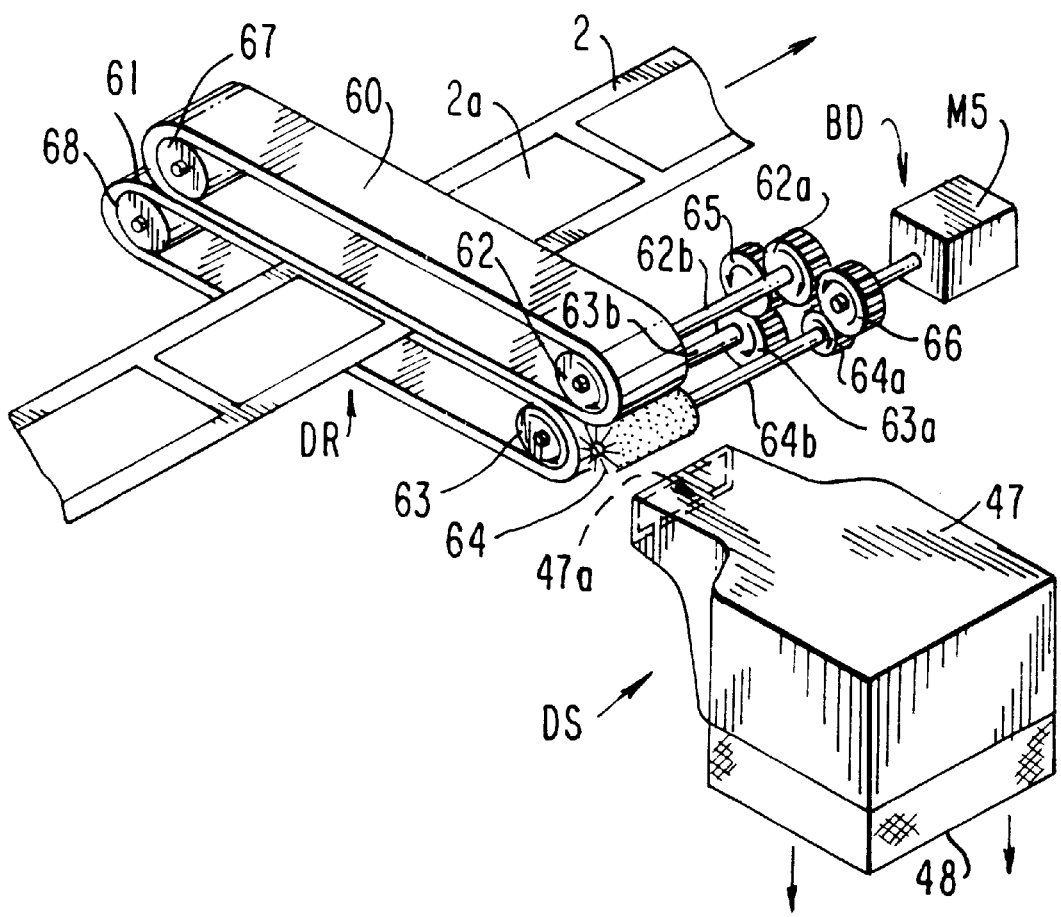
FIG. 13 is a perspective view of major portions relating to a sixth embodiment of the invention.

As shown in FIG. 13, a dust removing apparatus DR of this embodiment includes, as endless belt type dust removing members RE, an upper cleaning belt 60 and a lower cleaning belt 61 disposed respectively above and under the photographic film 2. The apparatus further includes suction means DS for sucking dust from the dust adhered to the upper and lower cleaning belts 60, 61, and drive means BD for rotatably driving the upper and lower cleaning belts 60, 61. The suction means DS functions as the dust take-off member DE.

The drive means BD includes a drive roller 62 and a driven roller 67 about which the upper cleaning belt 60 is entrained, a drive roller 63 and a driven roller 68 for driving the lower cleaning belt 61, a driven gear 62a mounted on a connector shaft 62b to be driven in unison with the drive roller 62 mounted on the same connector shaft, a driven gear 63a mounted on a connector shaft 63b to be driven in unison with the drive roller 63 mounted on the same connector shaft, a motor M5 for rotatably driving the cleaning belts 60, 61, a motor roller 66 attached to a leading end of a rotary shaft of the motor M6, a substantially cylindrical brush roller 64 disposed so as to contact with both a curved portion B of the upper cleaning belt 60 and a curved portion B of the lower cleaning belt 61, a brush gear 64a mounted on a connector shaft 64b to be rotatable in unison with the brush roller 64 mounted on the same connector shaft, and an idle gear 65 for matching the rotation directions of the drive rollers 62, 63.

The suction means DS includes an air duct 47 having an opening 47a adjacent an outer periphery of the brush roller 64 and a fan 48 communicated with the air duct 47.

Figure 15:
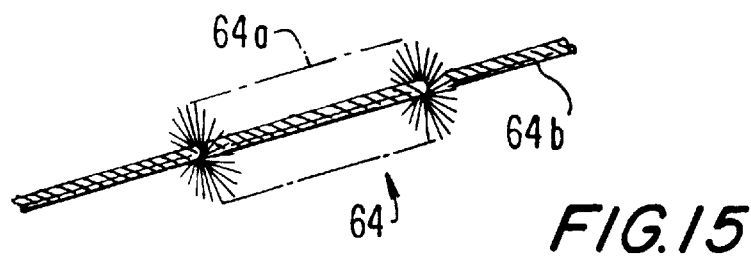
FIG. 15 is an enlarged view of a brush roller.

The detailed construction of the brush roller 64 is shown in FIG. 15. As shown, the roller includes a shaft 64b made of stainless steel and bristles 64a mounted on the periphery of the shaft 64b.

Dust adhered to the upper and lower cleaning belts 60, 61 is picked up by the brush roller 46 and this dust picked up by the roller 46 is eliminated by being suched by the suction means DS.

Figure 16:
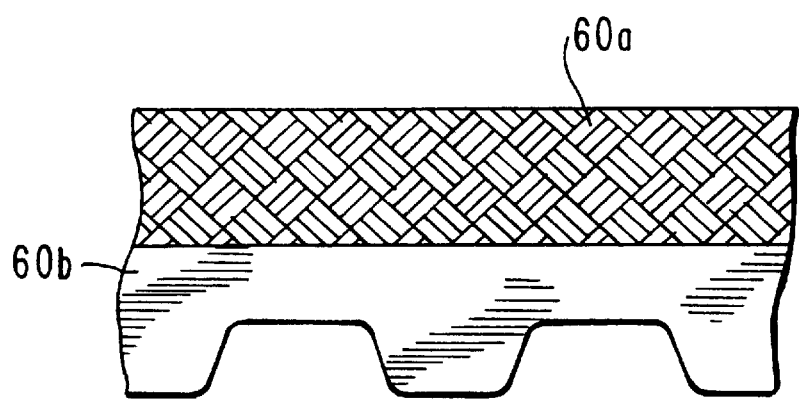
FIG. 16 is an enlarged view of a cleaning belt.

FIG. 16 is an enlarged view of an end face of the cleaning belts 60, 61. A side portion of this belt 60 or 61 contacting the photographgic film 2 is formed as an urethane cloth portion 60a and the opposite side portion is formed as a timing-belt portion 60b.

Outer peripheries of the drive rollers 62, 63 and of the driven rollers 66, 67 are configurated so as to engage with the timing-belt portion 60b.

In comparison with the brush belts 40, 41 used in the first embodiment, the construction using this urethane cloth portion is advantageous for not producing dust of its own, so that the dust removing operation may be effected more efficiently. That is to say, in the case of the brush belts 40, 41, the brushes may produce dust of their own, so that the suction means DS needs to have a sufficiently large suction capacity. Incidentally, this urethane cloth portion 60a is formed of a base of velvet covered with a urethane layer.

As the motor gear 66 is driven counterclockwise in FIG. 13 by the motor M5, the drive roller 62 is rotated clockwise. The rotation of the motor gear 66 is transmitted via the driven gear 62a and the idle gear 65 to the driven gear 63a to rotate the drive roller 63 clockwise.

Accordingly, since both of the upper cleaning belt 60 and the lower cleaning belt 61 are driven to rotate clockwise as viewed from the transport direction of the photographic film 2, the pair of contact portions of the cleaning belts 60, 61 contacting the front and back surfaces of the photographic film 2 are rotated in the opposite direction to each other at the single location on the transport direction of the photographic film 2.

As the drive rollers 62, 63 and the driven rollers 67, 68 are disposed away from each other on the right and left sides relative to the photographic film 2, the curved portions B of the cleaning belts 60, 61 formed by the drive rollers 62, 63 and the driven rollers 67, 68 too are located away from the photographic film 2.

Further, the brush roller 64 is rotated clockwise in FIG. 13. Then, by utilizing a centrifugal force association with this roller rotation, the dust adhered to the brush roller 64 may be removed by the sucking force of the fan 48 efficiently. Further, by forming the brush roller 64 of electrically conductive material, it is possible to prevent electric charging of the photographic film 2.

Figure 14:
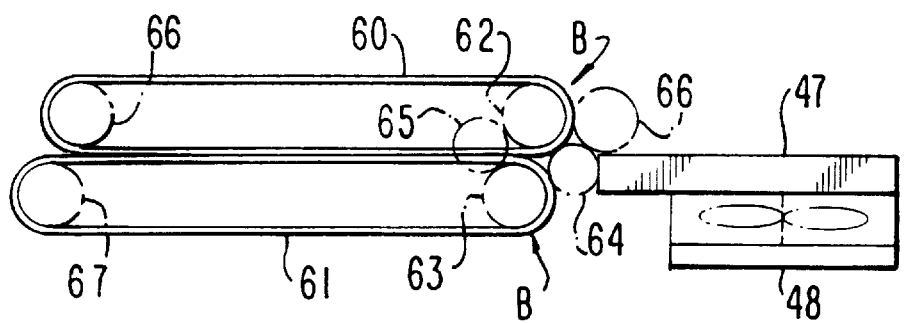
FIG. 14 is a side view of major portions relating to a seventh embodiment of the invention.

As may be understood from the side view of FIG. 14, the drive roller 62 and the drive roller 63 are offset to the right and left from each other relative to the transport direction of the photographic film 2. With this placement, the outer periphery of the brush roller 64 may be efficiently placed in contact with the curved portions B of the upper and lower cleaning belts 60, 61.

As described above, the dust is removed at a position different from the position of the photographic film 2 as the dusty surface to be treated, so that there occurs no inconvenience of reverse attachment of the dust to the photographic film 2.

(Seventh Embodiment)

Figure 17:
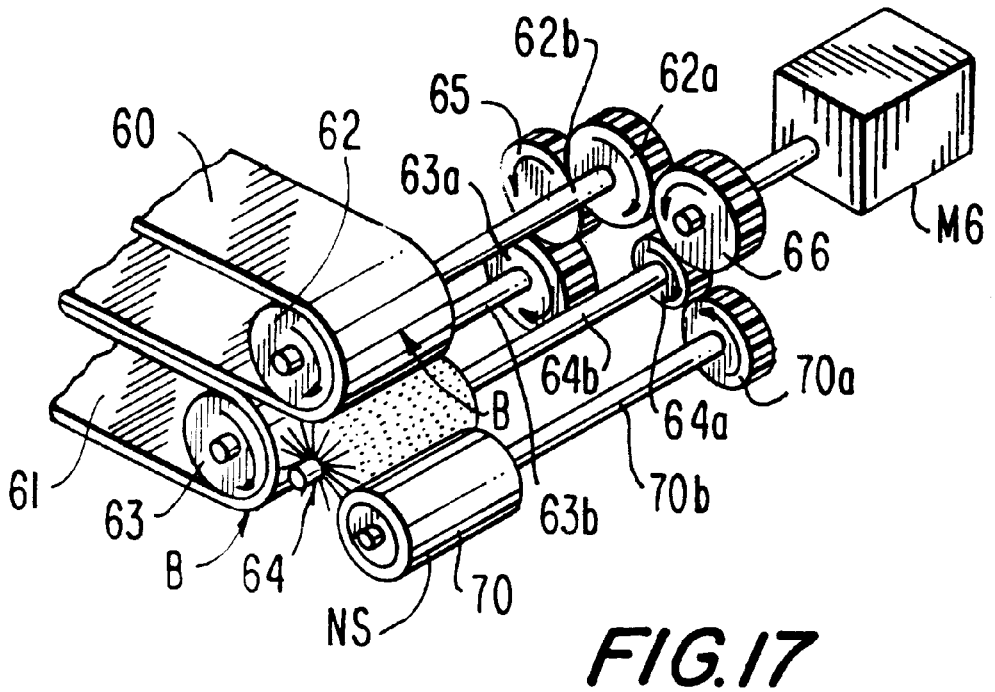
FIG. 17 is a perspective view of major portions relating to a seventh embodiment of the invention.

Next, a seventh embodiment of the invention will be described with reference to FIG. 17.

This embodiment differs from the sixth embodiment in that instead of the suction means DS comprised of the air duct 47 and the fan 48 there is provided a substantially cylindrical adhesive roller 70. This adhesive roller 70 is integrally connected with the driven gear 70a via a common connector shaft 70b. That is to say, the dust adhered to the brush roller 64 is eliminated by the adhesive roller 70.

This adhesive roller 70 is a substantially cylindrical member formed mainly of urethane resin material and the outer peripheral face of the cylindrical member is coated with adhesive material to provide an adhesive face NS.

In order to drive the adhesive roller 70, the motor M6 rotates the motor gear 66 and this rotation is transmitted via the driven gear 64a to a driven gear 70a.

In comparison with the foregoing construction using the air duct 47 and the fan 48, this construction using the adhesive roller 70 is advantageous for allowing further size reduction of the entire apparatus.

(Eighth Embodiment)

Figure 18:
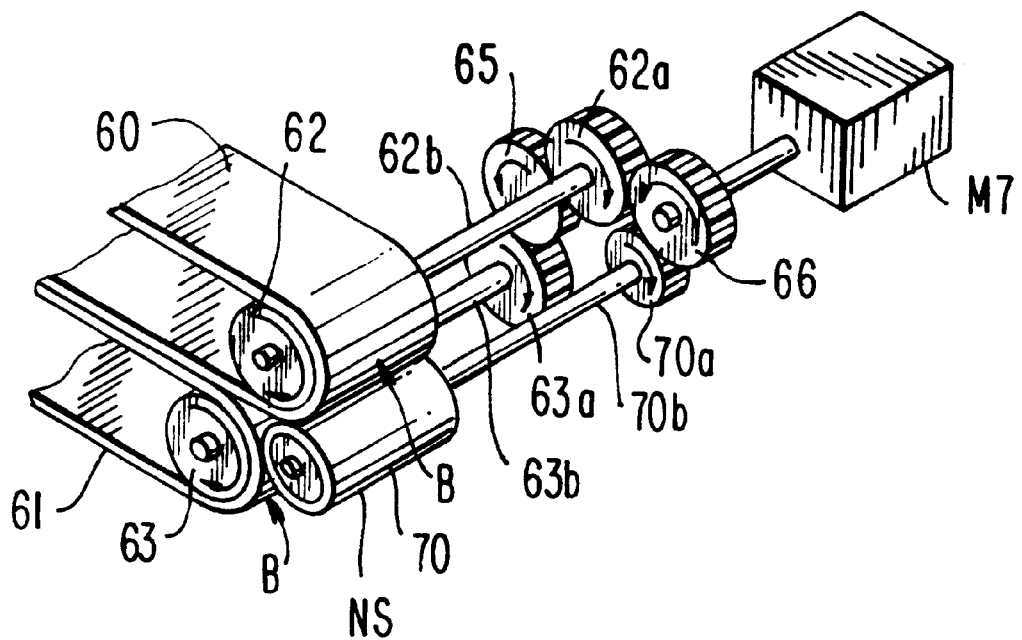
FIG. 18 is a perspective view of major portions relating to an eighth embodiment of the invention.

An eighth embodiment of the invention will be described next with reference to FIG. 18.

In this eighth embodiment, the outer peripheral face of the adhesive roller 70 is placed in contact with the upper and lower cleaning belts 60, 61. With this construction, the dust may be removed directly by the adhesive roller 70 without the brush roller, so that this construction allows still further reduction in the size of the entire apparatus in comparison with the apparatus of the seventh embodiment.

(Ninth Embodiment)

A ninth embodiment of the invention will be described next with reference to FIGS. 19, 20 and 21.

This embodiment relates to a further modified dust removing apparatus construction using belts.

For a dust removing operation, the photographic film 2 must pass through the dust removing face RS. That is, the photographic film 2 must pass between the upper belt and lower belt. As means for facilitating this passage, it is conceivable to cause the upper belt and the lower belt to cross each other as viewed from above the film transporting plane.

However, with such means, if the leading end of the film is curled or bent, a jamming of the photographic film may occur.

In this respect, according to the instant embodiment, the dust removing faces RS are rendered to open and close relative to each other, and, more particularly, the dust removing faces are movable between a first position where the faces do not provide dust removing action to the photographic film 2 and a second position where the faces provide the removing action to the same.

Figure 19:
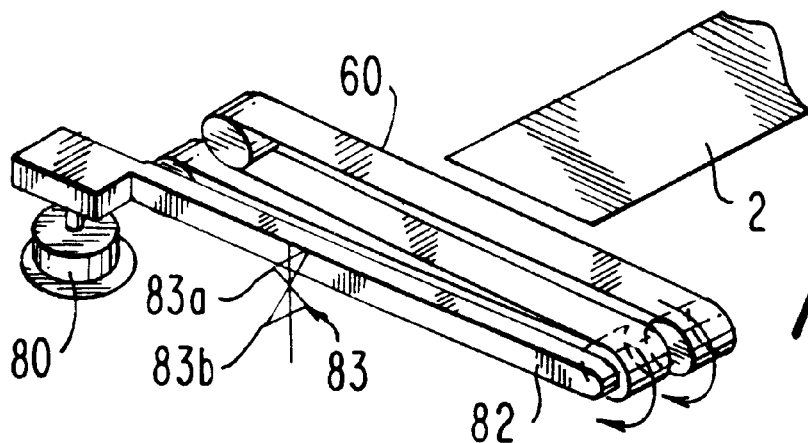
FIG. 19 is a perspective view of major portions relating to a ninth embodiment under a condition before insertion of a photographic film.
Figure 20:
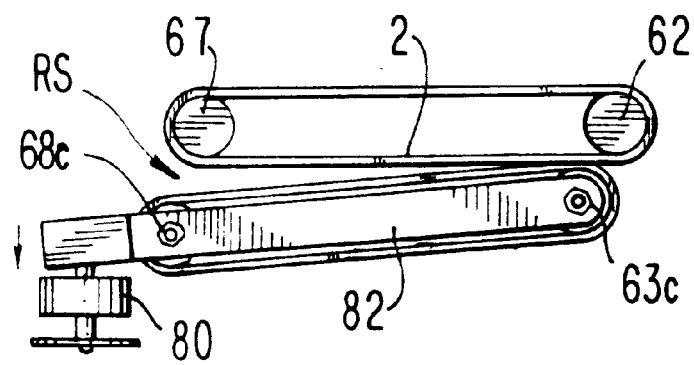
FIG. 20 is a side view of the major portions relating to the ninth embodiment under the condition before the insertion of the photographic film film.

FIG. 19 illustrates the condition where the dust removing faces RS are located at the first position and FIG. 20 illustrates the further condition where the faces RS are located at the second position.

Figure 21:
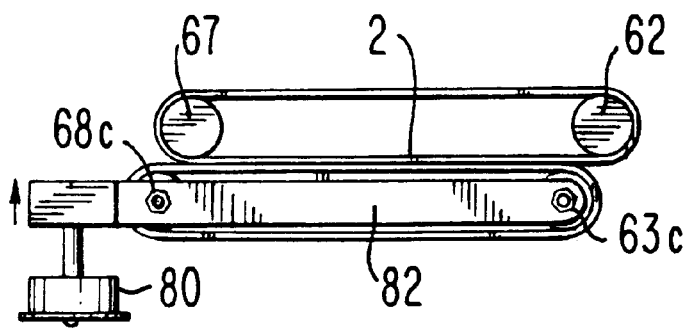
FIG. 21 is a side view of the major portions relating to the ninth embodiment under a further condition after the insertion of the photographic film film.

Incidentally, the detailed constructions of the entire dust removing apparatus are not shown in FIGS. 19, 20 and 21.

A guide member 82 is connected to an output portion of a solenoid 80 and the guide member 82 and the lower cleaning belt 61 are connected integrally with each other. More specifically, the member 82 and the belt 61 are connected via shafts 63a, 68c disposed at the centers of the drive roller 63 and the driven roller 68 respectively. The solenoid 80 functions as drive means for driving the dust removing faces RS to be opened and closed relative to each other.

An optical sensor 83 including a light emitting element 83a such as a light emitting diode and a light receiving element 83b such as a light receiving transistor is provided for detecting presence and absence of the photographic film 2. This optical sensor 83 functions as detecting means for detecting presence/absence of the photographic film 2.

When the photographic film 2 is absent, as illustrated in FIG. 19, the guide member 82 is slightly inclined as viewed from the transport direction of the photographic film. So that, the dust removing faces RS are opened relative to each other to allow smooth insertion of the photographic film 2 between the dust removing faces (i.e. between the upper and lower cleaning belts 60, 61).

When the photographic film 2 passes between the dust removing faces, this passage of the photographic film 2 is detected by the optical sensor 83. Upon this detection, the solenoid 80 is switched ON, so as to drive the guide member 82 from the first position shown in FIG. 19 or FIG. 20 to the second position shown in FIG. 21. Thereafter, the unillustrated dust removing apparatus is activated for effecting a dust removing operation.

After completion of the dust removing operation on the photographic film 2, the photographic film 2 is moved away from the dust removing faces RS. This movement of the photographic film 2 away from the dust removing faces RS too is detected by the optical sensor 83, and with this detection the solenoid 80 is switched OFF. Whereby, the dust removing faces RS are returned from the second position to the first position and maintained at this position until insertion of a next photographic film 2.

The above operations are automatically controlled by the controller 7.

(Tenth Embodiment)

Figure 22:
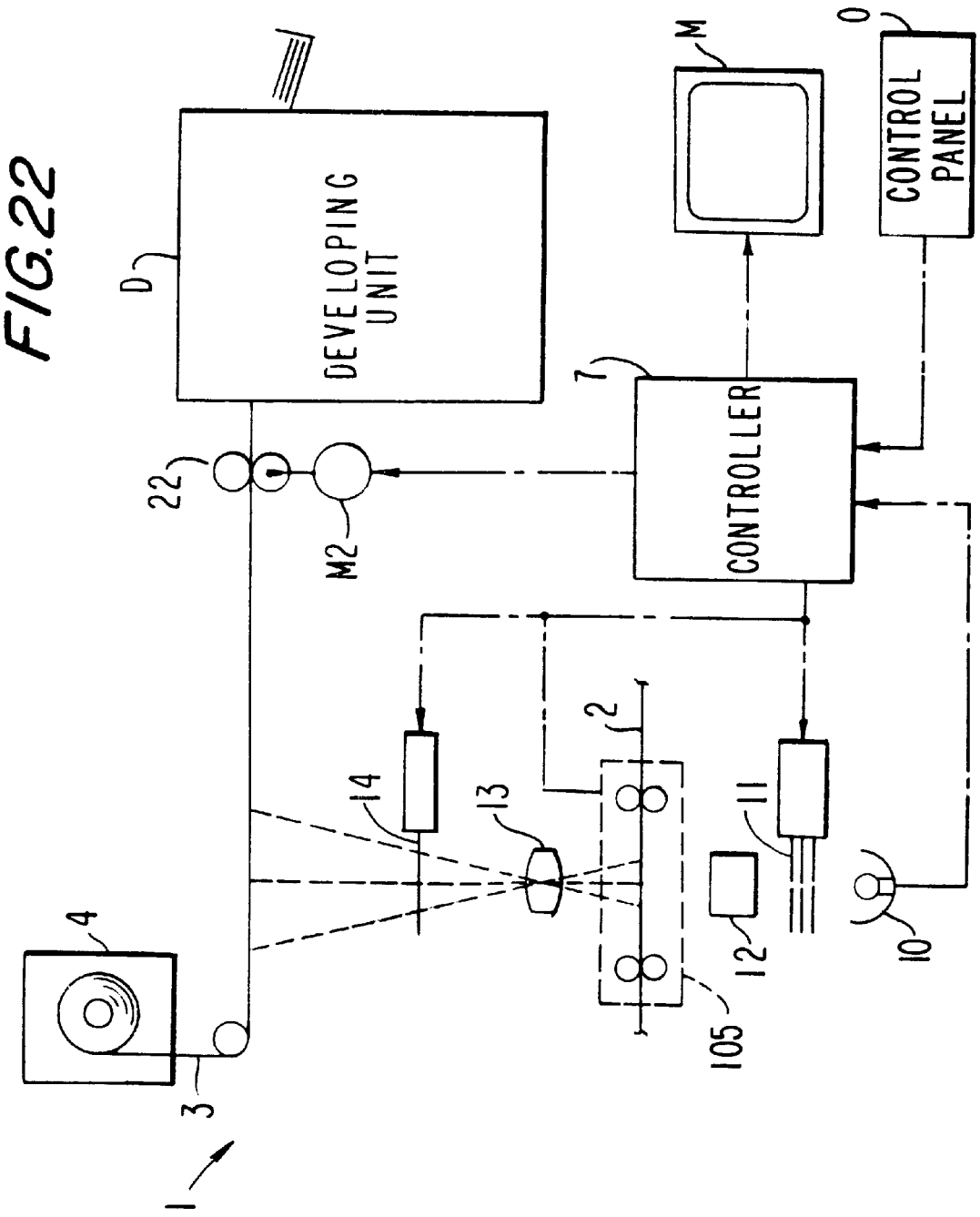
FIG. 22 is a diagram showing an image printer equipped with a dust removing apparatus according to a tenth embodiment of the invention.

Next, with reference to FIGS. 22 through 30, there will be described a still further embodiment in which the dust removing apparatus relating to the present invention is used in a photographic processing system for processing a film having magnetic recording portions. In FIG. 22, components corresponding to those shown in FIG. 1 are denoted with the same reference numerals, and in the following description, such components shown in FIG. 1 will not be described in repetition. Further, it is understood that features disclosed in the instant embodiment may be employed in all of the foregoing embodiments unless any contradictions may occur and conversely that all the features of the foregoing embodiments may be employed in the instant embodiment unless any contradictions may occur. It is also understood that the above also applies to between and among all of the foregoing embodiments.

In FIG. 22, the dust removing apparatus according to this embodiment is shown within a film transport unit 105.

Figure 25:
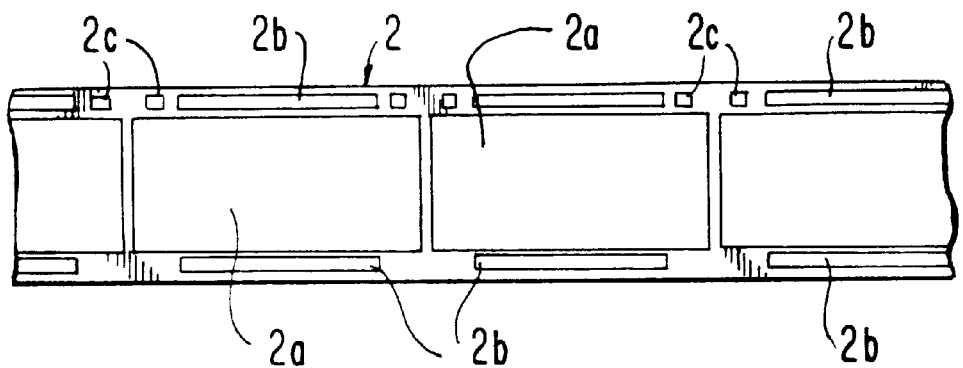
FIG. 25 is a view showing magnetic recording portions of a film, FIGS. 26(a) and (b) are schematic views of a cleaning head.

First, the film 2 to which the present embodiment relates will be described with reference to FIG. 25. This film 2 is used in the new system commonly referred to as APS. The film 2 includes an image recording portion 2a for recording images, magnetic recording portions 2b provided upwardly and downwardly of the image recording portion 2a, and perforations 2c. This film 2 is stored within a film cartridge 180 shown in FIG. 27, which in turn is attached to a cartridge holder 140. Then, the film 2 is withdrawn from the cartridge and transported in the direction A which is the transporting direction of the film 2. The further direction B is the opporite direction to the direction A.

The film transport unit 105 includes, as paired frame members, upper and lower units 120, 121 which are connected to be pivotable to each other about a shaft 122, with the units being urged to open by means of springs 123.

Figure 23:
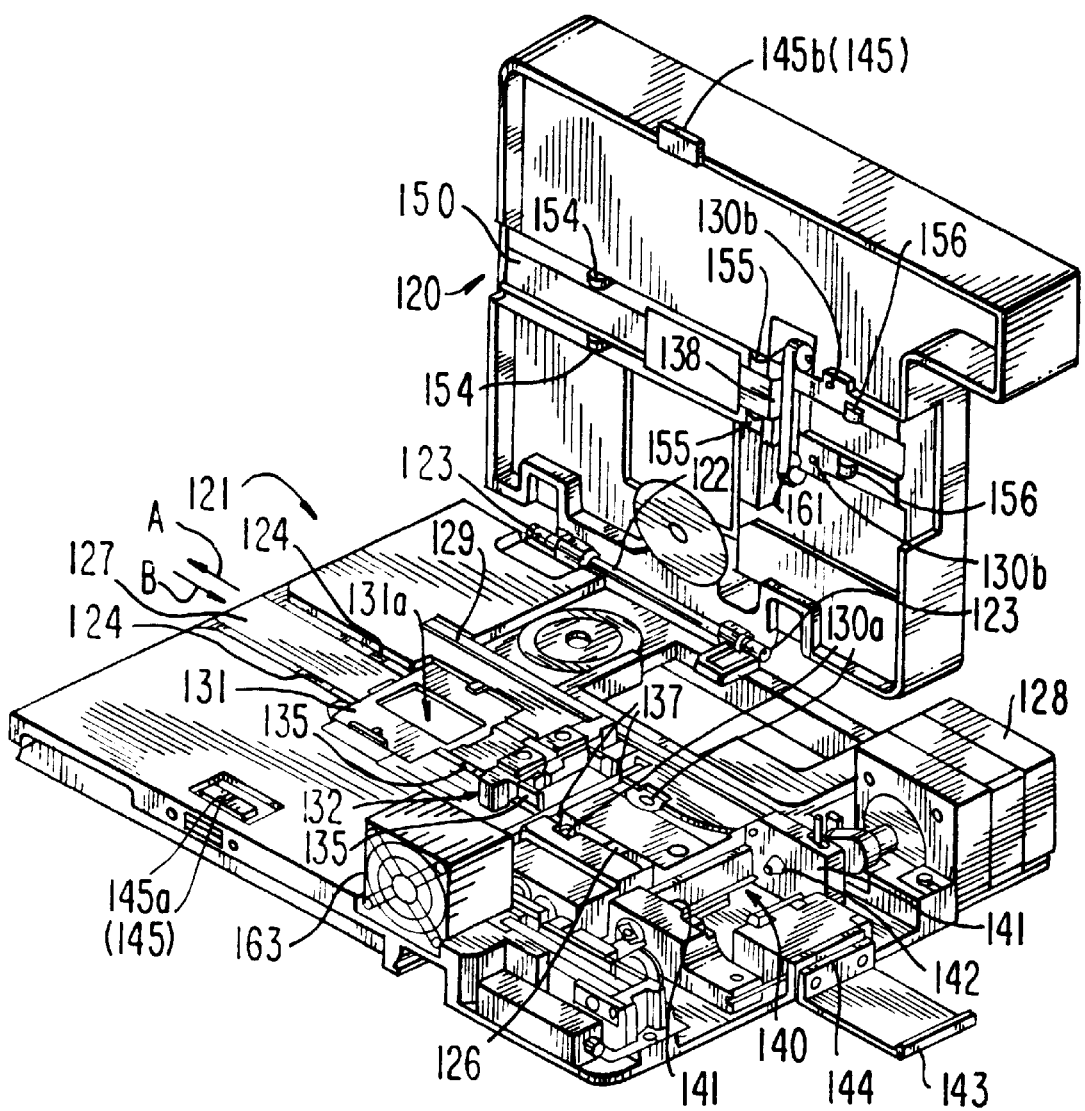
FIG. 23 is an overall perspective view of a film transport unit.
Figure 24:
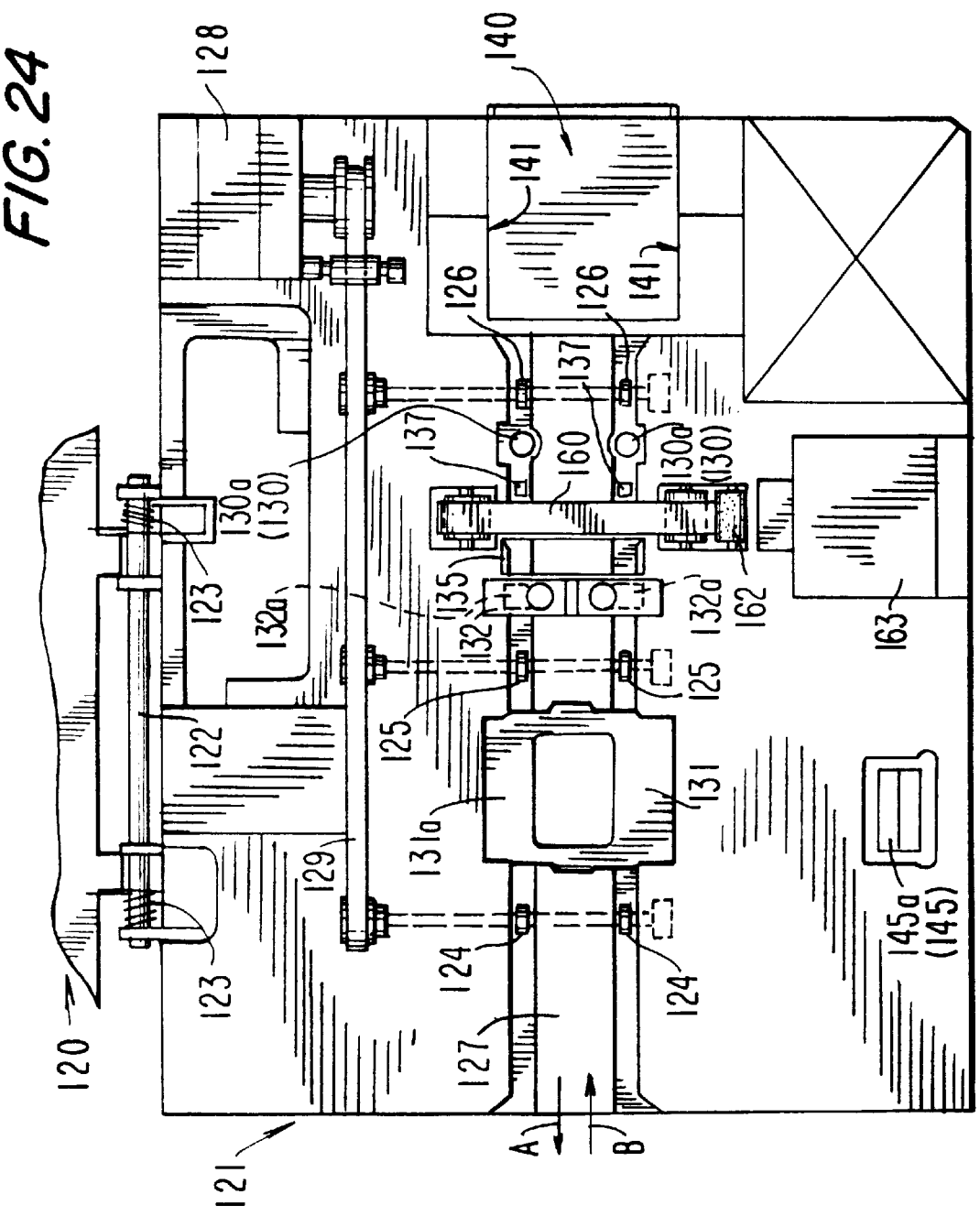
FIG. 24 is a plan view of the film transport unit shown in FIG. 22.

The open condition of the upper and lower units 120, 121 is shown in FIG. 23. FIG. 24 is a plan view of the lower unit 121.

The lower unit 121 is shown in details in FIGS. 23 and 24. The unit includes drive rollers 124, 125, 126 for transporting the film 2. The unit further includes a lower guide 127 provided as a recess at a portion where the image bearing face of the film is caused to pass. This lower guide 127 in cooperation with an upper guide 160 of the upper unit 120 to be described later, supports and guides the right and left ends of the film 2. The drive rollers 124, 125, 126 are driven via a belt 129 by means of a motor 128. The lower unit includes a beam emitting portion 130a of an optical sensor 130 which portion cooperates with a beam receiving portion 130a included in the upper unit 120 to detect optical data of the film 2. A negative mask 131 includes an aperature 131a for delimiting an area of the image recording portion of the film 2 to be printed on to a print paper 103.

A magnetic head unit 132 includes a pair of magnetic heads 132a for reading information magnetically recorded at the magentic recording portions 2b of the film 2. That is, a pair of these magnetic heads 132a are provided in correspondence with the pair of upper and lower magnetic recording portions 2b of the film shown in FIG. 25. A lower cleaning belt 160 and a fan 163 constitute portions of a dust removing apparatus (second cleaning means) for removing dust from a film surface. Details of this apparatus will be given later. The drive motor 128 drives the drive rollers 124, 125, 126 via the belt 129, as described above. In addition, this drive motor 128 drives also the lower cleaning belt 160 via an unillustrated transmission mechanism.

Between the magnetic head unit 132 and the lower cleaning belt 160, there is provided a guide member 135 which includes slanted portions 135a for allowing smooth transportation of the film 2 past the dust removing apparatus 134 to the magnetic head unit 132. Adjacent the lower cleaning belt 160, there is disposed a movable head member 137 constituting portions of a cleaning head 136 (first cleaning means) (see FIG. 26).

Figure 27:
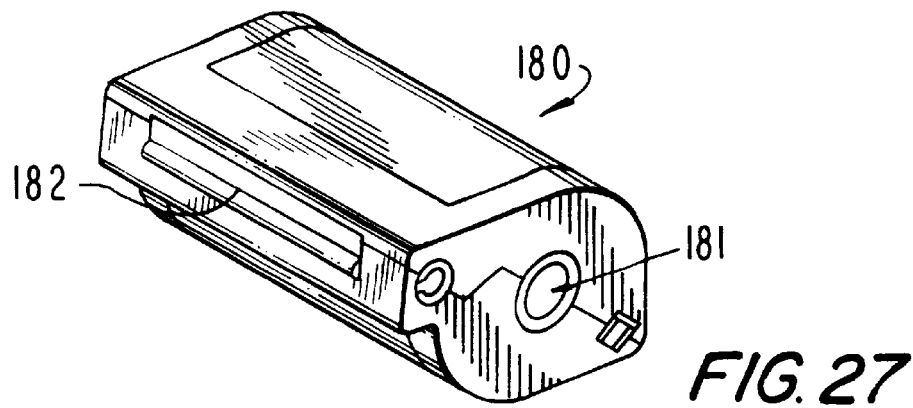
FIG. 27 is an outer appearance view of a film cartridge.

The cartridge holder 140 holds the film cartridge 180 shown in FIG. 27 storing the film 2 therein. The cartridge 180 is supported in the longitudinal direction thereof by being bound between a pair of opposed walls 141. These walls 141 include projections 142 whieh are to be inserted into opposed holes 181 formed in the cartridge 180, whereby the cartridge 180 is fixed in position. The cartridge holder 140 further includes a lid 143 which is pirotable about a pivot shaft 144. Then, for holding the cartridge 180, the lid 143 is opened, as illustrated in FIG. 23.

The upper unit 120 is shown in details in FIG. 23. The upper unit 120 includes the upper guide 160 provided as an upper recess where the image bearing face of the film 2 is caused to pass. As described hereinbefore, the upper guide 160 in cooperation with the lower guide 127 supports and guides the right and left ends of the film 2. The upper unit 120 further includes press rollers 154, 155, 156 disposed in opposition to the drive rollers 124, 125, 126 when the upper unit 120 and the lower unit 121 are closed to each other. The beam receiving portion 130b of the optical sensor 130 is disposed at the position which comes into opposition to the beam emitting portion 130a of the sensor provided in the lower unit 121 when the units 120, 121 are closed to each other. Further, an upper cleaning belt 161 is provided at a position corresponding to the lower cleaning belt 160. This upper cleaning belt 161 is driven by means of a motor and a transmission mechanism neither of which are shown. The upper unit further includes a stationary head member 138 in opposition to the movable head members 137.

The upper unit 120 and the lower unit 121 having the above-described constructins are closed and connected with each other via engaging portions 145, i.e. a hooked portion 145a provided in the lower unit 121 and a pawl portion 146b provided in the upper unit 120.

Figure 26A:
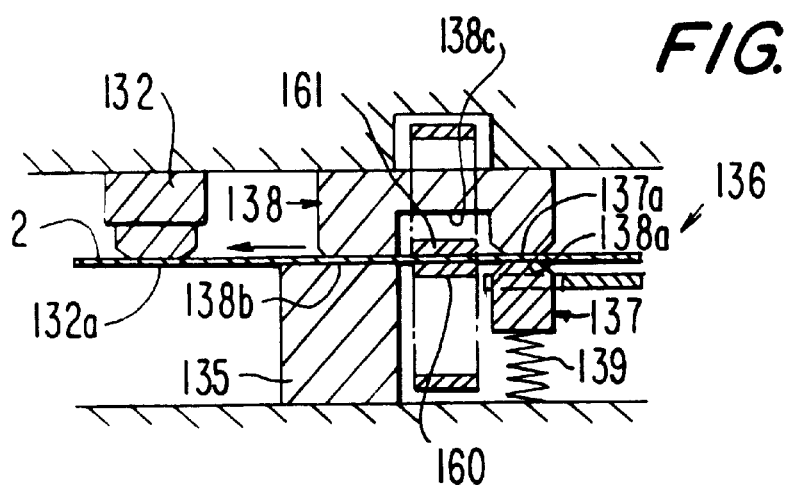
Figure 26B:
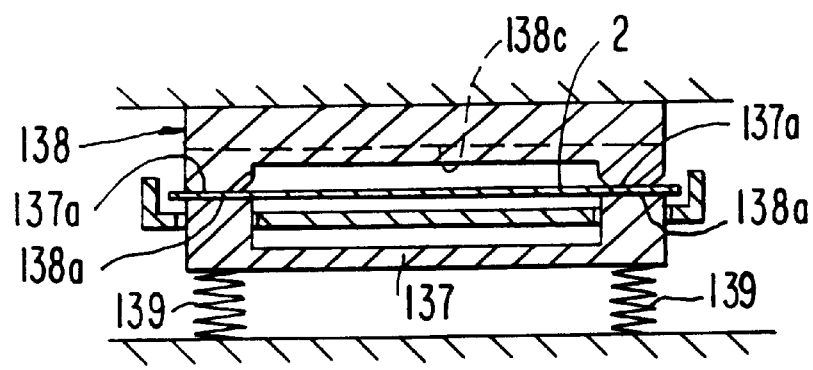

Next, with reference to FIG. 26, the construction of the cleaning head 136 and of the other adjacent components will be described in greater details. FIG. 26(a) is a section taken along the transporting direction of the film and FIG. 26(b) is a section taken along the width direction of the film.

The movable head member 137 and the stationary head memeber 138 are disposed in opposition to each other to bind the face of the film 2 therebetween. The stationary head member 138 is fixed to the upper unit 120. Thereas, the movable head member 137 is biased against the stationary head member 138 by means of a pair of springs 139. The movable head member 137 includes a pair of leading ends 137 projecting into the film transport passage. Each leading end 137a has a substantially arcuate shape. The statinary head member 138 includes a leading end 138a disposed in opposition to the leading end 137a, a contact portion 138b disposed in opposition to the guide member 135 and a groove portion 138c for guiding the upper cleaning belt 161. The leading end 138a includes a slanted face for facilitating introduction of the film 2. The movable head member 137 and the stationary head member 138 having the above-described constructions are made of stainless steel hardened by a plasma nitriding treatment, so as to obtain improved resistance against friction. Further, the leading ends 137a, 138a are finished by buff polishing so as not to damage the film 2 during its cleaning.

In FIG. 26, on the image and magnetic recording side of the film 2, the stationary head member 138 and the magnetic head 132a of the magnetic head unit 132 are disposed.

Next, the dust removing apparatus 134 will be described with reference to FIG. 28.

Incidentally, in this figure, the other constructions inside the film transport unit 105 are eliminated from the view for the purpose of facilitating the understanding.

Figure 28:
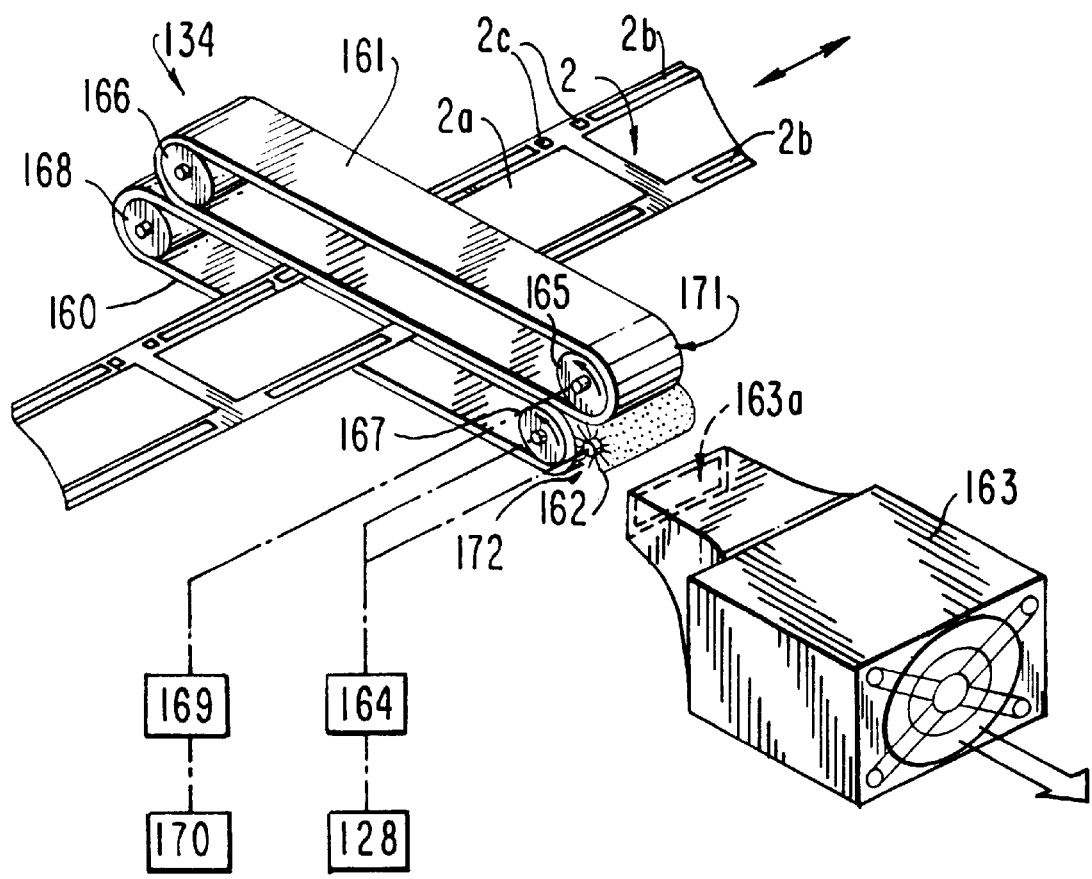
FIG. 28 is a perspective view showing an outer appearance of a dust removing apparatus.

As shown in FIG. 28, the dust removing apparatus 134 includes the upper cleaning belt 161 and the lower cleaning belt 160 as the endless belt type dust removing members disposed one above the other across the film 2, a brush roller 162 for eliminating dust adhered to the upper and lower cleaning belts 160, 161, a fan 163 for sucking the dust attached to the brush roller 162, the drive motors 128, 170 for rotatably driving the upper and lower cleaning belts 128, 170, and transmission units 164, 169. As may be apparent from the above description, the construction of this dust removing apparatus 134 is very similar to that of the sixth embodiment, except for a drive mechanism to be described next.

For driving the upper and lower cleaning belts 160, 161, a following construction is provided. Namely, the upper cleaning belt 162 is driven in the direction of an arrow in FIG. 28 by means of a drive roller 165 and a driven roller 166. The lower cleaning belt is driven in the direction of a further arrow in FIG. 28 by means of a drive roller 167 and a driven roller 168. The drive roller 165 is operatively connected with the drive motor 170 via the transmission unit 169 which includes a reduction mechanism comprised of e.g. gears. Similarly, the drive roller 167 and the brush roller 162 are operatively connected with the drive motor 128 via the transmission unit 164. The brush roller 162 having a substantially cylindrical configuration is disposed in such a manner as to contact both a curved portion 171 of the upper cleaning belt 161 and a curved portion 172 of the lower cleaning belt 160. The brush roller 162 is driven to rotate in the direction of arrow.

An opening 163a of the fan 163 as the suction means is disposed in the vicinity of the outer periphery of the brush roller 162.

The brush roller 162 includes bristles mounted on and about a stainless core shaft.

In operation, the dust collected on the upper and lower cleaning belts 160, 161 is removed by the brush roller 162 and this dust on the brush roller 162 is sucked and eliminated by the fan 163.

Of the above components of the dust removing apparatus 134, the lower cleaning belt 160, drive roller 167, driven roller 168, brush belt 162, fan 163, transmission unit 164 and the drive motor 128 are disposed in the lower unit 121. Further, the upper cleaning belt 161, drive roller 165, driven roller 166, transmission unit 169 and the drive motor 170 are disposed in the upper unit 120.

Next, the functions and operations of the photographic printing apparatus will be described.

By opening the film transport unit 105, the film cartridge 180 is set to the cartridge holder 140. After this setting of the cartridge 180, the film transport unit 105 is closed. Thereafter, in response to a predetermined start signal, the film 2 is withdrawn from the cartridge 180. This withdrawn film 2 is then transported by the motor 128 in the direction of arrow A in FIGS. 23 or 24. Also, in synchronism with the withdrawal of the film 2, the upper and lower cleaning belts 160, 161 are driven.

The withdrawn film 2 is first caused to pass the optical sensor 130, during which the sensor reads information optically recorded in the film 2. Next, the film is caused to pass the cleaning head 136, during which dust, expecially coagulated developing liquid is eliminated from the film by scraping. Immediately after the passage through the cleaning head 136, the film passes between the upper and lower cleaning belts 160, 161, during which a dust cleaning operation is effected over the entire width of the film 2 so as to remove dust or the like particularly from the image recording portion 2a of the film 2. The removed dust is carried away by the fan 163 to the outside of the film transport unit 105.

After the passage through the upper and lower cleaning belts 160, 161, the magnetic head unit 132 reads the information from the magnetic recording portions 2b. This information reading operation may be effected with high accuracy because the dust, solidified developing liquid or the like has just been removed from the film.

After the magnetically recorded information corresponding to the all of the frames 2a has been read in association with transportation of the film 2 in the direction of arrow A, the film 2 is once transported reversely in the direction of arrow B. Then, the film 2 is again transported in the direction of arrow A to have its frames 2a to be exposed and printed at the exposure unit 200 one after another. In this printing exposure of the fim 2, each frame 2a of the film is stopped and fixed in position at the opening 131a. Alternatively, the printing exposure operation may be effected in association with the reverse transportation of the film in the direction of arrow B.

In the above-described construction of FIG. 23, the arrangement is such that the cleaning head 136, dust removing apparatus 134, magnetic head unit 132, and the opening 131a are disposed in this order from the upstream side in the transporting direction A. Other arrangements are also conceivable.

Figure 29:
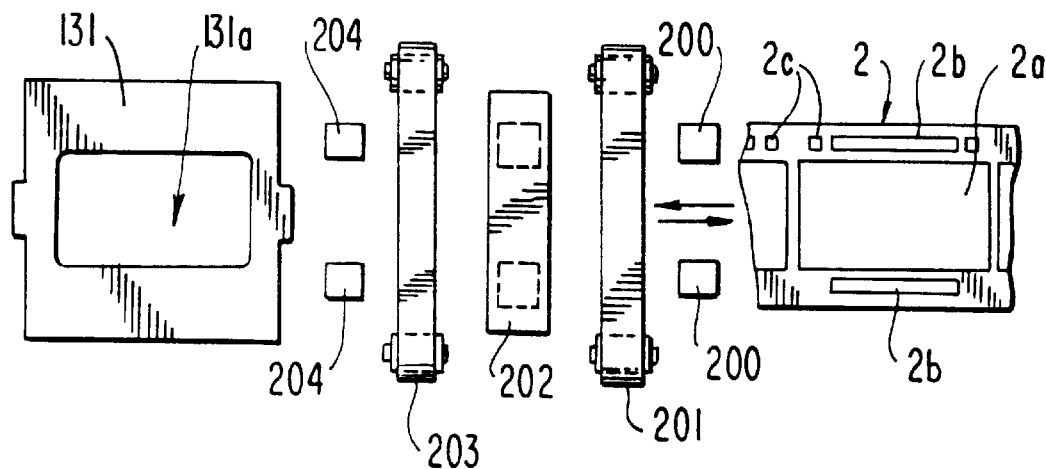
FIG. 29 is a view showing a first alternative arrangement of the cleaning head.

For example, in FIG. 29, the arrangement is in the order of the cleaning head 200, dust removing apparatus 201, magnetic head unit 202, another dust removing apparatus 203, another cleaning head 204 and then the spring 131a. In the case of this arrangement, the reading operation of the magnetic information is possible in either direction of A or B.

Figure 30:
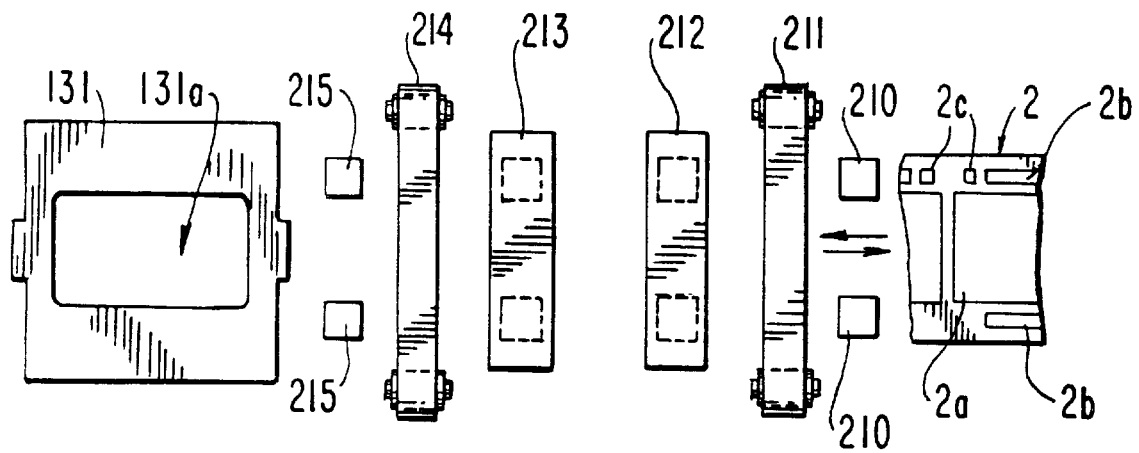
FIG. 30 is a view showing a second alternative arrangement of the cleaning head.

FIG. 30 shows a still further arrangement in the order of a cleaning head 210, dust removing apparatus 211, magnetic writing head unit 212, magnetic reading head unit 213, another dust removing apparatus 214, another cleaning head 215, and then the opening 131a. In the case of this arrangement, the writing operation of the magnetic information is possible in the forward transport direction A and the reading operation of the magnetic information is possible in the reverse transport direction B. Further, in the case of this arrangement, the magentic writing head unit 212 and the magnetic reading head unit 213 may be switched over in the disposing order. Also, an additional dust removing apparatus and/or cleaning head may be interposed between the magnetic writing head unit 212 and the magnetic reading head unit 213.

(Other Embodiments)

The first and second embodiments employ, as the dust removing members in the form of endless belts, the brush belts 40, 41 having the brush side face contacting the photographic film 2. Instead, the dust removing members may comprise e.g. cloth material in the form of endless belts.

In the first, second and sixth through ninth embodiments, the belts 40, 41, 60, 61 of the dust removing apparatus DR are entrained so as to transverse the transport direction of the photographic film 2 at 90 degrees. Instead, these belts may be disposed at any other angle relative to the transport direction, or may be disposed parallel with the transport direction of the photographic film 2 so as to minimize the width relative to the transport direction of the photographic film 2.

Further, the upper belt 40, 60 and the lower belt 41, 61 may be arranged to cross each other in the plan view.

In the first, second and sixth through ninth embodiments, the upper belt 40, 60 and the lower belt 41, 61 of the dust removing apparatus DR are arranged to contact respectively the front and back surfaces of the photographic film 2 at one location on the transport direction of the photographic film 2. Instead, the upper belt 40, 60 and the lower belt 41, 61 may be arranged to contact the photographic film 2 at different locations on the transport direction of the photographic film 2.

In the first, second and sixth through ninth embodiments, in order to contact the front and back surfaces of the photographic film 2, the two belts, i.e. the upper belt 40, 60, and the lower belt 41, 61 are provided. Instead, a single belt may be provided in such a manner that the belt is entrained in the substantially C-shaped arrangement to be driven to contact the front and back surfaces of the photographic film 2.

In the first and second embodiment, the openings 47a, 47b of the air duct 3 of the suction means DS of the dust removing apparatus DR are disposed to face the first one of the curved portions B of the brush belts 40, 41 in the order after the contact with the photographic film 2. Instead, the openings may be provided for all the curved portions B or at any other loctions than the curved portions B.

The suction means DS may be provided in a plurality or this suction means DS may be eliminated at all.

In the first, second and sixth through ninth embodiments, the brush belts 40, 41, 60, 61 are each entrained about the drive roller 42 and the driven roller 43. Instead, two upper and lower belts each entrained about one roller may be arranged to contact the photographic film 2 from the upper and lower sides thereof.

In the third and fourth embodiments, the cylindrical brush rollers 30, 31 are employed for removing the dust from the photographic film 2. Instead, a cloth member in the form of a belt may be entrained to contact the photographic film 2 and the dust adhered to the cloth member may be eliminated therefrom by the adhesive rollers 32, 33.

Further, a belt-like base member having a brush face may be arranged to be driven to rotate in contact with the photographic film 2.

In the third through fifth and eighth embodiments, the adhesive rollers 32, 33, 70 constitute the dust take-off members DE. Instead, a planar adhesive sheet may be fed serially to come into contact with the dust removing face RS located at the non-removing position.

In the ninth embodiment, the dust removing apparatus employs the endless belts 60, 61. Instead, the construction of this embodiment may be applied to the further constructions of the third through fifth embodiments using the cylindrical dust removing members. Further, in place of the construction in which only the lower belt is movable, both the upper and lower belts may be rendered movable.

In the ninth embodiment, the presence/absence of the photographic film 2 is detected by the optical sensor 83. Instead, this may be detected magnetically or mechanically.

In the tenth embodiment, the dust removing apparatus is incorporated within the film transport unit 105. However, the present invention is not limited to such integral unit type construction.

As the magnetic head unit employed in the tenth embodiment, any of the read-only type head unit, write-only type head unit and read-and-write type head unit may be employed in the present invention.

In the tenth embodiment, in the construction of the transporting means disclosed therein, the film 2 is transported by a plurality of drive rollers 124, 125, 126. Instead, the film may be transported by means of a belt also. Further, the output shaft of the drive motor 128 may be connected via a series of gears with the drive rollers 124, 125, 126.

In the tenth embodiment, it is conceivable to provide a slanted face in the stationary head member 138 at a portion thereof coming into contct with the film 2 so as to carry the removed dust away from the film transport passage.

In all the foregoing embodiments, the dust removing apparatuses for photosensitive material are used in combination with an image printer system. Instead, the apparatuses may be used in combination with any other device or system using a photosensitive material such as a film projector. Or, the apparatus may be used as an independent apparatus.

In all the foregoing embodiments, the dust removing apparatuses are used in combination with an image printer system for remiving dust from a photographic photographic film film 2. Instead, the apparatuses may be used for removing dust from any other elongate band-like member such as a VTR tape, an audio tape or the like.

The apparatuses may be further used for dust removal of any other object of any configuration other than the band-like configuration In all the foregoing embodiments, the dust removing apparatus DR is constructed to remove dust from both the front and back surfaces of the photographic photographic film film 2 as the elongate band-like material. Instead, the apparatus may be modified to remove dust from only one surface of the material.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A dust removing apparatus for removing dust from a sheet-like photosensitive material transported along a transport passage, comprising:

a stationary portion;

dust removing means movable relative to the stationary portion for removing dust from said sheet-like photosensitive material, said dust removing means comprising a first dust removing member having a cylindrical shape and comprising a first dust removing brush surface that contacts a front surface of said sheet-like photosensitive material and a second dust removing member having a cylindrical shape and comprising a second dust removing brush surface that contacts a back surface of said sheet-like photosensitive material; and dust take-off means having an adhesive surface which comes into contact with said first and second dust removing brush surfaces for taking the dust therefrom by adhesion thereto.

2. A dust removing apparatus according to claim 1, wherein drive means is provided for rotatably driving the first dust removing member about an axis extending at the center of a substantially circular cross section of the first dust removing member when the first dust removing portion is maintained in contact with the sheet-like photosensitive material.

3. A dust removing apparatus according to claim 2, wherein the dust take-off means is formed as a substantially cylindrical member having an adhesive peripheral surface.

4. A dust removing apparatus according to claim 2, wherein at least one of the first and second dust removing members has a conductive portion.

5. A dust removing apparatus according to claim 2, wherein at least one of the first and second dust removing members has an adhesive property at a predetermined portion thereof.

6. A dust removing apparatus for removing dust from a sheet-like photosensitive material transported along a transport passage, comprising:

a stationary portion;

dust removing means movable relative to said stationary portion for removing dust from said sheet-like photosensitive material, said dust removing means comprising a first dust removing member having a first dust removing surface that contacts said sheet-like photosensitive material, and a second dust removing member having a second dust removing surface that contacts said sheet-like photosensitive material; and dust take-off means having an adhesive surface which comes into contact with said first and second dust removing surfaces for taking the dust therefrom by adhesion thereto, wherein the second dust removing member is disposed adjacent the first dust removing member, the first dust removing surface of the first dust removing member extends discontinuously in the direction of the rotary axis of the first dust removing member, the second dust removing surface of the second dust removing member extends discontinuously in the direction of the rotary axis, and the first dust removing surface of the first dust removing member and the second dust removing surface of the second dust removing member are disposed alternately to each other in the direction of the rotary axis.

7. A dust removing apparatus according to claim 6, wherein the dust take-off means is a substantially cylindrical take-off member having an adhesive peripheral surface.

8. A dust removing apparatus for removing dust from a sheet-like photosensitive material transported along a transport passage, comprising dust removing means comprising a first dust removing member having a first dust removing surface that contacts a front surface of said sheet-like photosensitive material, and a second dust removing member having a second dust removing surface that contacts a back surface of said sheet-like photosensitive material, said first and second dust removing members being positioned such that said first dust removing member cooperates with said second dust removing member to hold said sheet-like photosensitive material therebetween;

dust take-off means having an adhesive face which comes into contact with the first and second dust removing surfaces to take the dust off the first and second dust removing surfaces by adhesion thereto; and actuating means connected to at least one of said first and second dust removing surfaces for moving said at least one of said first and second dust removing surfaces between a first position where said at least one of said first and second dust removing surfaces is away from said sheet-like photosensitive material and a second position where said first and second dust removing surfaces cooperate to remove dust from said sheet-like photosensitive material.

9. A dust removing apparatus according to claim 8, further comprising:

sensor means for detecting presence of said sheet-like photosensitive material wherein said actuating means moves said at least one of said first and second dust removing surfaces between said first position and said second position based on an output from said sensor means.

10. A dust removing apparatus for removing dust from a sheet-like photosensitive material transported along a transport passage comprising:

a stationary portion;

dust removing means movable relative to the stationary portion and having a dust removing portion for coming into contact with the sheet-like material; and dust take-off means having an adhesive face which comes into contact with the dust removing portion to take the dust off the dust removing portion by adhesion thereto; wherein the dust removing portion is formed of urethane cloth.

11. A dust removing apparatus for removing dust from a sheet-like photosensitive material transported along a transport passage in a transporting direction, comprising a stationary portion; and dust removing means movable relative to the stationary portion for removing dust from said sheet-like photosensitive material, said dust removing means comprising a first surface and an auxiliary adhesive surface positioned laterally of said first surface with respect to said transporting direction, said auxiliary adhesive surface having a greater adhesive power than said first surface.

12. A dust removing apparatus according to claim 11, wherein said dust removing means is cylindrical and said first surface comprises a brush surface.

13. A dust removing apparatus according to claim 11, wherein said auxiliary adhesive surface is positioned on both lateral sides of said first surface.

\* \* \* \* \*